(12) United States Patent
Kern

(10) Patent No.: US 10,192,418 B1
(45) Date of Patent: Jan. 29, 2019

(54) SYSTEM AND METHOD FOR PERIMETER SECURITY

(71) Applicant: V7X PATENTS LLC, Richmond, VA (US)

(72) Inventor: Geoffrey M. Kern, Richmond, VA (US)

(73) Assignee: Geoffrey M. Kern, Chester, VA (US)

( * ) Notice: Subject to any disclaimer, the term of this patent is extended or adjusted under 35 U.S.C. 154(b) by 0 days.

(21) Appl. No.: 16/005,638

(22) Filed: Jun. 11, 2018

(51) Int. Cl.
*G08B 15/02* (2006.01)
*G08B 13/196* (2006.01)
*G05D 1/00* (2006.01)
*G05D 1/02* (2006.01)
*G08B 7/06* (2006.01)

(52) U.S. Cl.
CPC .......... *G08B 15/02* (2013.01); *G05D 1/0022* (2013.01); *G05D 1/0278* (2013.01); *G08B 7/06* (2013.01); *G08B 13/19695* (2013.01)

(58) Field of Classification Search
CPC .... G08B 15/02; G08B 7/06; G08B 13/19695; G05D 1/0022; G05D 1/0278
See application file for complete search history.

(56) References Cited

U.S. PATENT DOCUMENTS

| | | | |
|---|---|---|---|
| 4,097,025 A | 6/1978 | Dettmann | |
| 4,125,886 A | 11/1978 | D'Agostino | |
| 4,525,701 A | 6/1985 | Leih | |
| 4,630,110 A | 12/1986 | Cotton | |
| 4,651,144 A | 3/1987 | Pagano | |
| 4,703,313 A | 10/1987 | Husmann | |
| 4,746,909 A | 5/1988 | Israel | |
| 4,764,008 A | 8/1988 | Wren | |
| 4,777,526 A | 10/1988 | Saitoh | |
| 4,803,468 A | 2/1989 | Seifert | |
| 4,870,404 A | 9/1989 | Husmann | |
| 4,918,473 A | 4/1990 | Blackshear | |
| 4,920,331 A | 4/1990 | Ver Loren | |
| 4,945,367 A | 7/1990 | Blackshear | |
| 5,111,288 A | 5/1992 | Blackshear | |
| 5,202,673 A | 4/1993 | Conrad | |

(Continued)

FOREIGN PATENT DOCUMENTS

AU 5928594 A 10/1994
AU 2015370427 A1 8/2017
(Continued)

*Primary Examiner* — Nay Tun
(74) *Attorney, Agent, or Firm* — Foley & Lardner LLP

(57) ABSTRACT

A perimeter security system for maintaining an object relative to a predefined boundary includes a plurality of water displacement devices configured to output fluid and to control a pressure of the outputted fluid when the object is within a first predetermined distance from the boundary. The system further includes a plurality of light sources configured to emit light toward the object when the object is within a second predetermined distance from the boundary. The system additionally includes an auditory system configured to emit an audible output when the object is within a third predetermined distance from the boundary, and a visual sensor configured to obtain images or video of at least a portion of the predetermined boundary and to transmit the images or video to a location other than the predefined boundary.

6 Claims, 17 Drawing Sheets

(56) References Cited

U.S. PATENT DOCUMENTS

| | | | |
|---|---|---|---|
| 5,402,000 A * | 3/1995 | Owens, II | G08B 15/02 340/426.28 |
| 5,438,316 A | 8/1995 | Motsinger | |
| 5,483,224 A | 1/1996 | Rankin | |
| 5,495,288 A | 2/1996 | Broady | |
| 5,652,567 A | 7/1997 | Traxler | |
| 5,796,330 A * | 8/1998 | Vinette | G08B 15/02 109/29 |
| 5,819,124 A | 10/1998 | Somner | |
| 5,829,913 A | 11/1998 | Puckett | |
| 5,980,123 A | 11/1999 | Heifler | |
| 6,094,135 A * | 7/2000 | Sugimoto | G08B 15/02 340/425.5 |
| 6,098,718 A | 8/2000 | Sato | |
| 6,209,801 B1 * | 4/2001 | Kearby | B05B 15/70 239/205 |
| 6,286,765 B1 | 9/2001 | Byles | |
| 6,375,370 B1 | 4/2002 | Wesselink | |
| 6,429,893 B1 | 8/2002 | Xin | |
| 6,470,784 B1 | 10/2002 | Bonavita | |
| 6,478,237 B2 * | 11/2002 | Kearby | B05B 15/70 239/232 |
| 6,700,488 B1 | 3/2004 | Leyden | |
| 6,709,171 B2 | 3/2004 | Wesselink | |
| 6,709,172 B2 | 3/2004 | Brown | |
| 6,917,288 B2 | 7/2005 | Kimmel | |
| 6,937,151 B1 | 8/2005 | Tapanes | |
| 6,937,647 B1 | 8/2005 | Boyd | |
| 6,940,405 B2 | 9/2005 | Script | |
| 6,972,676 B1 | 12/2005 | Kimmel | |
| 6,977,585 B2 | 12/2005 | Falk | |
| 7,049,965 B2 | 5/2006 | Kelliher | |
| 7,183,907 B2 | 2/2007 | Simon | |
| 7,187,279 B2 | 3/2007 | Chung | |
| 7,193,508 B2 | 3/2007 | Hill | |
| 7,287,929 B1 | 10/2007 | Sokolowski | |
| 7,315,243 B1 | 1/2008 | Speakman | |
| 7,349,025 B2 | 3/2008 | Wong | |
| 7,397,368 B2 | 7/2008 | Otto | |
| 7,429,139 B2 | 9/2008 | Wesselink | |
| 7,450,006 B1 | 11/2008 | Doyle | |
| 7,463,145 B2 | 12/2008 | Jentoft | |
| 7,465,108 B2 | 12/2008 | Brown | |
| 7,471,197 B2 | 12/2008 | McRae | |
| 7,554,445 B2 | 6/2009 | Script | |
| 7,692,540 B2 | 4/2010 | Doyle | |
| 7,703,996 B1 | 4/2010 | Sexton, Jr. | |
| 7,751,590 B2 | 7/2010 | Sharoni | |
| 7,772,972 B2 | 8/2010 | Kuroda | |
| 7,782,187 B2 | 8/2010 | Kondo | |
| 7,792,711 B2 | 9/2010 | Swafford, Jr. | |
| 7,847,675 B1 | 12/2010 | Thyen | |
| 7,872,585 B2 * | 1/2011 | Scully | G08B 15/02 340/541 |
| 7,880,630 B2 | 2/2011 | Stapleton | |
| 7,952,608 B2 | 5/2011 | Thompson | |
| 7,990,268 B2 | 8/2011 | Richman | |
| 8,018,489 B2 | 9/2011 | McCutchen | |
| 8,269,626 B2 | 9/2012 | Gates | |
| 8,269,640 B2 * | 9/2012 | Ueno | G08B 15/02 340/520 |
| 8,305,211 B1 | 11/2012 | Morris | |
| 8,310,360 B2 | 11/2012 | Ross, Jr. | |
| 8,346,592 B2 | 1/2013 | Torvmark | |
| 8,432,281 B2 | 4/2013 | Reese | |
| 8,456,304 B2 | 6/2013 | Van Doorn | |
| 9,530,296 B2 | 12/2016 | Doyle | |
| 9,633,536 B1 * | 4/2017 | Makarovich | G08B 15/02 |
| 9,679,459 B2 * | 6/2017 | Crowe | G08B 15/02 |
| 9,741,221 B1 * | 8/2017 | Rehfeld | G08B 13/19645 |
| 9,779,598 B2 | 10/2017 | DiPoala | |
| 9,861,092 B2 * | 1/2018 | Purpura | A01M 29/16 |
| 9,931,654 B2 | 4/2018 | West | |
| 2002/0145519 A1 * | 10/2002 | Hykawy | G08G 1/164 340/567 |
| 2002/0171557 A1 | 11/2002 | Wegener | |
| 2004/0216165 A1 | 10/2004 | Inata | |
| 2004/0264954 A1 | 12/2004 | Wesselink | |
| 2005/0024493 A1 | 2/2005 | Nam | |
| 2005/0226610 A1 | 10/2005 | Wesselink | |
| 2006/0171453 A1 | 8/2006 | Rohlfing | |
| 2006/0238337 A1 | 10/2006 | Minassian | |
| 2006/0279423 A1 | 12/2006 | Nazari | |
| 2007/0035394 A1 | 2/2007 | Houston | |
| 2007/0047641 A1 | 3/2007 | Bellinson | |
| 2007/0076094 A1 | 4/2007 | Dickerson | |
| 2007/0122003 A1 | 5/2007 | Dobkin | |
| 2008/0012941 A1 | 1/2008 | Brown | |
| 2008/0030329 A1 | 2/2008 | Whaley | |
| 2008/0036595 A1 | 2/2008 | Hollstien | |
| 2008/0106408 A1 | 5/2008 | Winkler | |
| 2008/0111687 A1 | 5/2008 | Husmann | |
| 2008/0136630 A1 * | 6/2008 | Leggett | G08B 15/02 340/541 |
| 2008/0169922 A1 | 7/2008 | Issokson | |
| 2009/0027493 A1 | 1/2009 | Amar | |
| 2009/0040307 A1 | 2/2009 | Rubin | |
| 2009/0121861 A1 | 5/2009 | Latham | |
| 2009/0122144 A1 * | 5/2009 | Latham | G08B 13/19632 348/155 |
| 2009/0140848 A1 | 6/2009 | Rollins | |
| 2009/0160667 A1 | 6/2009 | Musete | |
| 2009/0167862 A1 | 7/2009 | Jentoft | |
| 2009/0201190 A1 | 8/2009 | Huthoefer | |
| 2009/0244279 A1 | 10/2009 | Walsh | |
| 2010/0149336 A1 * | 6/2010 | Wang | F41H 9/04 348/158 |
| 2010/0194565 A1 | 8/2010 | Houston | |
| 2010/0265066 A1 | 10/2010 | Edelman | |
| 2011/0012734 A1 * | 1/2011 | Reese | G08B 13/19 340/541 |
| 2011/0050418 A1 | 3/2011 | Hart | |
| 2011/0172954 A1 | 7/2011 | Berger | |
| 2014/0008119 A1 | 1/2014 | Brandt | |
| 2014/0028474 A1 | 1/2014 | Poeth | |
| 2014/0159896 A1 | 6/2014 | Shapiro | |
| 2014/0331490 A1 | 11/2014 | Malins | |
| 2015/0061869 A1 * | 3/2015 | Crowe | G08B 15/02 340/541 |
| 2015/0075073 A1 | 3/2015 | Sylvester | |
| 2015/0161864 A1 | 6/2015 | Richman | |
| 2015/0228170 A1 | 8/2015 | Murphy | |
| 2016/0210831 A1 | 7/2016 | Woosnam | |
| 2016/0247372 A1 | 8/2016 | Sylvester | |
| 2016/0247371 A1 * | 8/2016 | Muhammad | G08B 15/001 |
| 2016/0286169 A1 | 9/2016 | Sannala | |
| 2016/0381027 A1 | 12/2016 | Mitchell | |
| 2017/0045336 A1 * | 2/2017 | Crowe | F41H 9/00 |
| 2017/0134895 A1 | 5/2017 | Rabb | |

FOREIGN PATENT DOCUMENTS

| | | |
|---|---|---|
| CN | 102938179 A | 2/2013 |
| CN | 103065411 A | 4/2013 |
| CN | 103075046 A | 5/2013 |
| CN | 203444602 U | 2/2014 |
| CN | 203882422 U | 10/2014 |
| CN | 104574737 A | 4/2015 |
| CN | 204679044 U | 9/2015 |
| CN | 105825606 A | 8/2016 |
| CN | 106781219 A | 5/2017 |
| CN | 206573158 U | 10/2017 |
| CN | 107564215 A | 1/2018 |
| EP | 551175 A1 | 7/1993 |
| EP | 587956 A1 | 3/1994 |
| ES | 2054553 B1 | 12/1996 |
| FR | 2908216 B1 | 1/2010 |
| FR | 2940000 A1 | 6/2010 |
| FR | 2939942 B1 | 1/2016 |
| GB | 2373326 B | 12/2003 |
| GB | 2416060 A | 1/2006 |

(56) References Cited

FOREIGN PATENT DOCUMENTS

| | | |
|---|---|---|
| GB | 2546009 A | 7/2017 |
| JP | 2005128845 A | 5/2005 |
| JP | 2007180647 A | 7/2007 |
| JP | 2010500695 A | 1/2010 |
| KR | 1020100053830 A | 5/2010 |
| KR | 1020110066058 A | 6/2011 |
| KR | 101375813 B1 | 3/2014 |
| KR | 101543542 B1 | 8/2015 |
| WO | WO-2007117579 A1 | 10/2007 |
| WO | WO-2013019659 A1 | 2/2013 |

\* cited by examiner

SYSTEM AND METHOD FOR PERIMETER SECURITY

FIELD

The present application relates generally to the field of security systems including, but not limited to, perimeter security systems for containment inside or outside of a perimeter.

BACKGROUND

Perimeter security systems are known for use in a wide variety of applications, including for counterterrorism and border security. Generally speaking, perimeter security systems include drawbacks such as being unwieldy and stationary. Such systems serve as passive defenses rather than play a role in proactive response management. Moreover, such systems are typically standalone and not integrated with other aspects of emergency response management.

SUMMARY

According to an exemplary aspect, a perimeter security system for maintaining an object relative to a predefined boundary includes a plurality of water displacement devices configured to output fluid and to control a pressure of the outputted fluid when the object is within a first predetermined distance from the boundary. The system further includes a plurality of light sources configured to emit light toward the object when the object is within a second predetermined distance from the boundary. The system additionally includes an auditory system configured to emit an audible output when the object is within a third predetermined distance from the boundary, and a visual sensor configured to obtain images or video of at least a portion of the predetermined boundary and to transmit the images or video to a location other than the predefined boundary.

According to a further exemplary aspect, a method of securing a perimeter comprises activating a first security system in response to a first stimulus, the first security system comprising a first plurality of water displacement devices, a first plurality of light sources, a first audiovisual system, and a first sensor suite; and activating a second security system following activation of the first security system, the second security system configured to provide an audiovisual output indicative of activation of the first security system. The second security system is activated by a controller in communication with the first security system and a computer network, the controller being configured to activate the second security system responsive to activation of the first security system and responsive to one or more of global positioning satellite data received by the controller, pre-planned route information stored in a memory of the controller, and emergency vehicle fleet information.

According to another exemplary aspect, a system comprises a plurality of water displacement devices configured to output fluid and to control a pressure of the outputted fluid when the object is within a first predetermined distance from the boundary; a network of conduits configured to channel the fluid to the respective water displacement devices; and a remote controller configured to selectively switch the water displacement devices between an off state and an on state in response to at least one of a communication from a controller or a remote monitor.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims. In the drawings, like reference numerals are used throughout the various views to designate like components.

Figure 1:
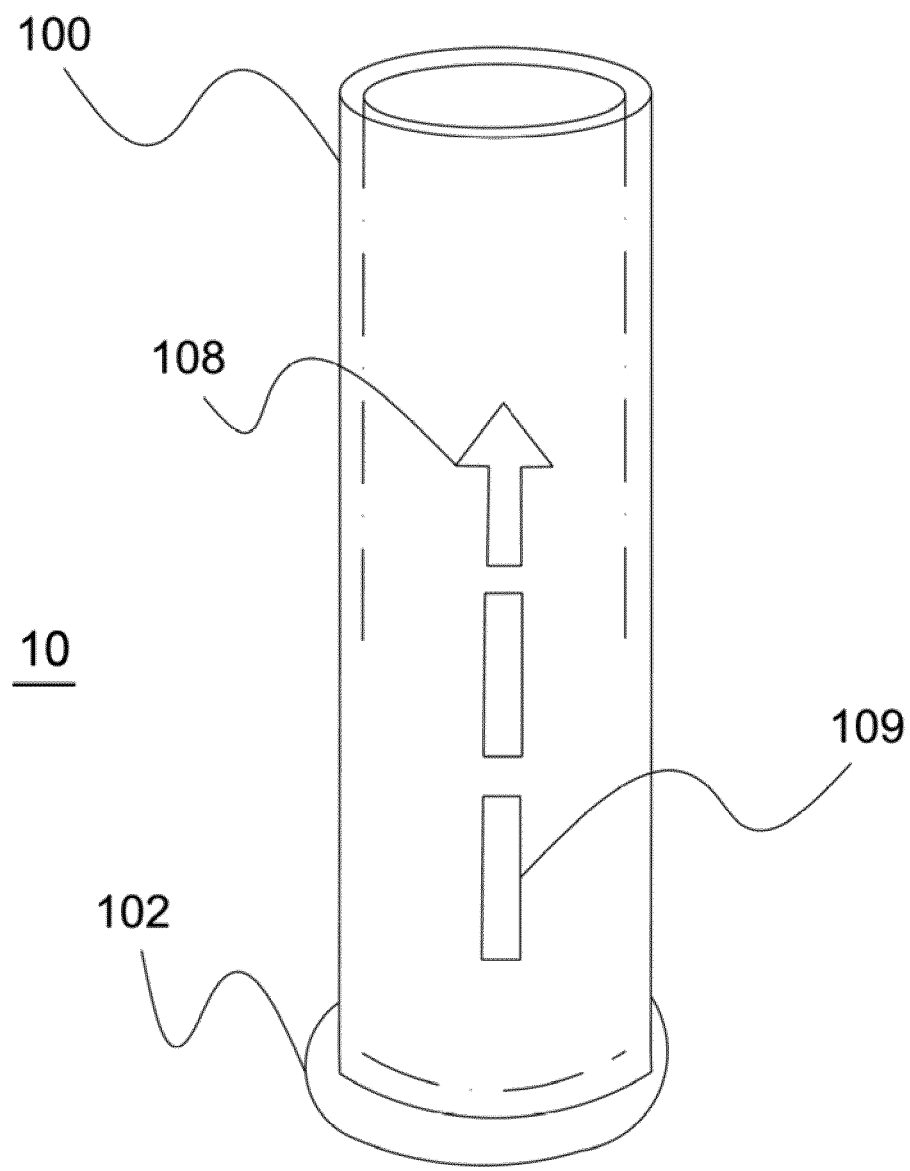
FIG. 1 is a schematic depiction of a system according to an exemplary embodiment.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Various exemplary implementations are described hereinafter. It should be noted that the specific implementations are not intended as an exhaustive description or as a limitation to the broader aspects discussed herein. One aspect described in conjunction with a particular implementation is not necessarily limited to that implementation and can be practiced with any other implementation(s).

The following terms are used throughout and are as defined below.

As used herein and in the appended claims, singular articles such as "a" and "an" and "the" and similar references in the context of describing the elements (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein, is intended merely to better illuminate the implementations and does not pose a limitation on the scope of the claims unless otherwise stated. No language in the specification should be construed as indicating any non-claimed element as essential.

The implementations, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of will be understood to include those elements specifically recited and those additional elements that do not materially affect the basic and novel characteristics of the claimed technology. The phrase "consisting of" excludes any element not specified. The expression "comprising" means "including, but not limited to." Thus, other non-mentioned components or steps may be present. Unless otherwise specified, "a" or "an" means one or more.

Unless otherwise indicated, all numbers expressing quantities of properties, parameters, conditions, and so forth, used in the specification and claims are to be understood as being modified in all instances by the term "about." Accordingly, unless indicated to the contrary, the numerical parameters set forth in the following specification and attached claims are approximations. Any numerical parameter should at least be construed in light of the number reported significant digits and by applying ordinary rounding techniques. The term "about" when used before a numerical designation indicates approximations which may vary by (+) or (−) 10%, 5% or 1%, for example.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Referring to FIG. 1, a security system 10 is shown. In at least one embodiment, the system 10 is implemented as a bollard, i.e. a cylindrical member in the form of a post, which may be employed as part of a perimeter protection system and/or emergency response system. The system 10 includes a cylindrical housing (an enclosure) 100 that is disposed atop a lip 102. In at least one embodiment, the diameter of housing 100 may be between 4-12 inches. The length of the housing 100 may be adjustable. The bollard in some embodiments may attain a first height in an extended position and a second height in a retracted position relative to a lip 102. In at least one embodiment, the bollard may be surface-mounted, embedded, rebounding, retractable and/or removable.

The housing 100 is a top-loadable housing that may be constructed from a metallic material such as steel according to at least one exemplary embodiment. In some embodiments, housing 100 can be constructed from a variety of materials and a plurality of manufacturing process treatments, finishes, coatings or surface or heat treatments may be applied to the housing 100. For example, the housing 100 may be constructed from raw steel, primed steel, painted steel, or hot-dip galvanized steel. In certain embodiments, metals or metal alloys other than steel may be used, with or without non-metallic materials including polymeric materials.

The lip 102 is dimensioned such that the circumference of the lip 102 extends past the housing 100. The lip 102 provides a secure platform to which a base of the housing 100 may be mounted. In at least one embodiment, the lip 102 may include one or more apertures through which one or more fasteners may be inserted to secure the lip 102 to a base and/or to the ground.

The housing 100 further includes a plurality of machined slots 109. The machined slots 109 define openings in the exterior of housing 100. Material placed in the interior of the housing 100 may thus be visible through the slots 109 when viewed from outside the housing 100. In at least one embodiment, reflective material may be placed inside the housing 100 so as to be visible through the slots 109.

The housing 100 may further include at least one machined slot 108 having the shape of an arrow. In some embodiments, the slot 108 may be shaped as an indicator signal other than an arrow. However, as shown in FIG. 1, the slot 108 includes an arrow head pointing upward, i.e., indicating a direction of horizontal, or vertical movement. As with the slots 109, the machined slot 108 defines an opening in housing 100. Material placed in the interior of the housing 100 may thus be visible through the slot 109 when viewed from outside the housing 100. In at least one embodiment, reflective material may be placed inside the housing 100 so as to be visible through slot 108. In some embodiments, the reflective material visible through slot 108 may be the same or different from the reflective material visible through slot 109. In at least one embodiment, the reflective material positioned in slots 108, 109 may serve to visually aid drivers of vehicles in a fleet of emergency vehicles 143 (discussed later). In at least one embodiment, in addition to aiding drivers of traditional human-driven cars, the reflective material may also aid detection systems/positioning systems of one or more autonomous vehicles in inclement weather. For example, the reflective material used in slots 108, 109 may be used to reflect light in order to use triangulation within the one or more autonomous vehicles, and to assist in trilateration.

Figure 2:
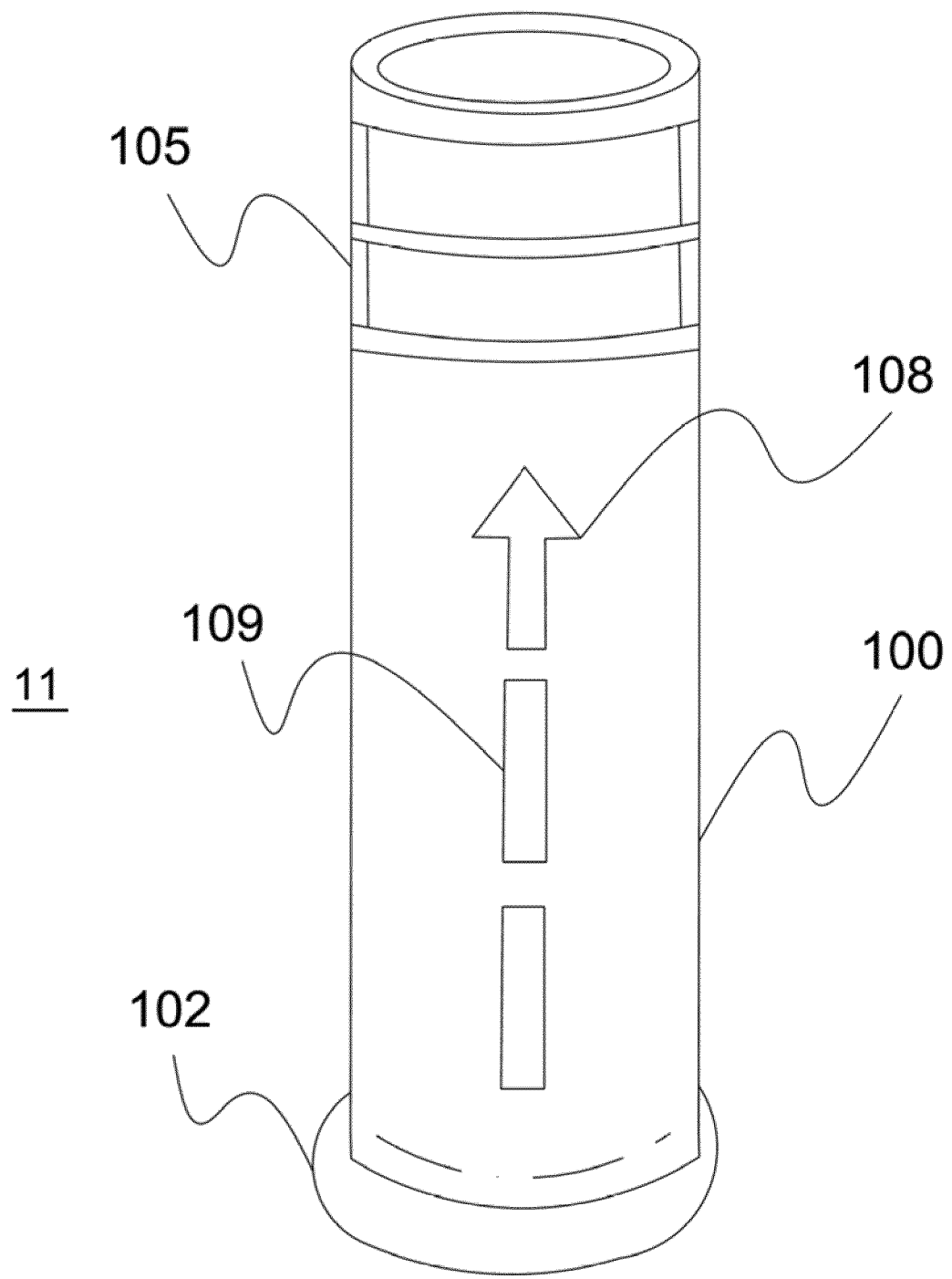
FIG. 2 is a schematic depiction of a system according to another exemplary embodiment.

FIG. 2 shows a system 11. In at least one embodiment, the system 11 is implemented as a portable bollard. The system 11 includes the components described above in regard to system 10, and further includes openings 105 at a top portion of the housing 100. The openings 105 define slots through which one or more inserts may be positioned. The one or more inserts may be protected using a semi-transparent or transparent material, such as acrylic glass.

Figure 3:
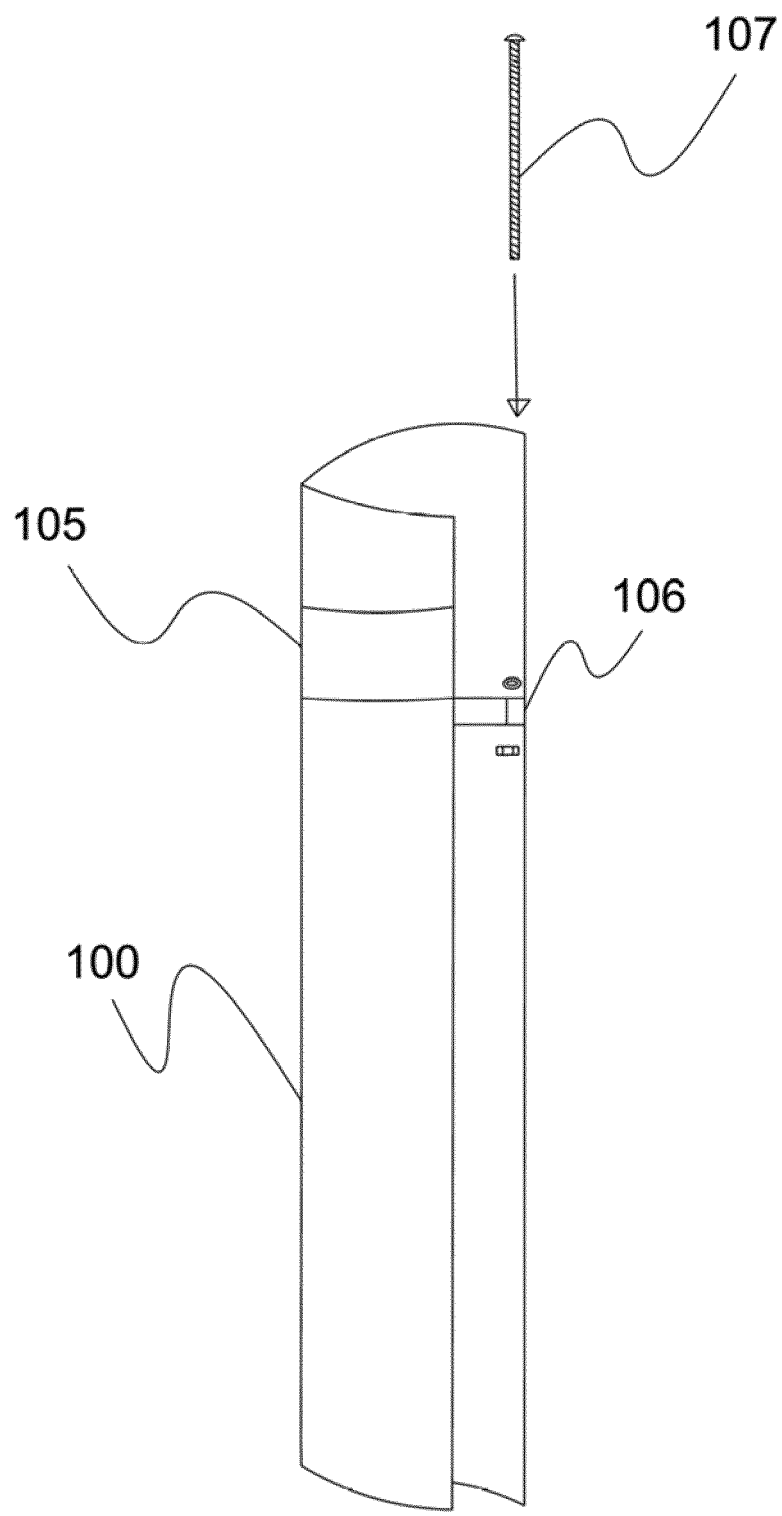
FIG. 3 is a cutaway depiction of a system according to an exemplary embodiment.

FIG. 3 is a cutaway depiction of a security system 11 according to an exemplary embodiment. As shown in FIG. 3, the system 11 is formed with a ridge member 106 that may be machined in an interior of the housing 100. The ridge member 106 may be used to lock in inserts to be visible through openings 105. A fastener 107, which may include a bolt, washer and a nut, is provided to secure the inserts to the ridge member 106. The system 10, 11 are configured to be top-loaded, in contrast to system 12, such that components may be inserted through an opening in the top of housing 100. Additional components may include spacers, rubberized elements, and waterproofing material to help protect the bollard and/or inserts therein.

Figure 4:
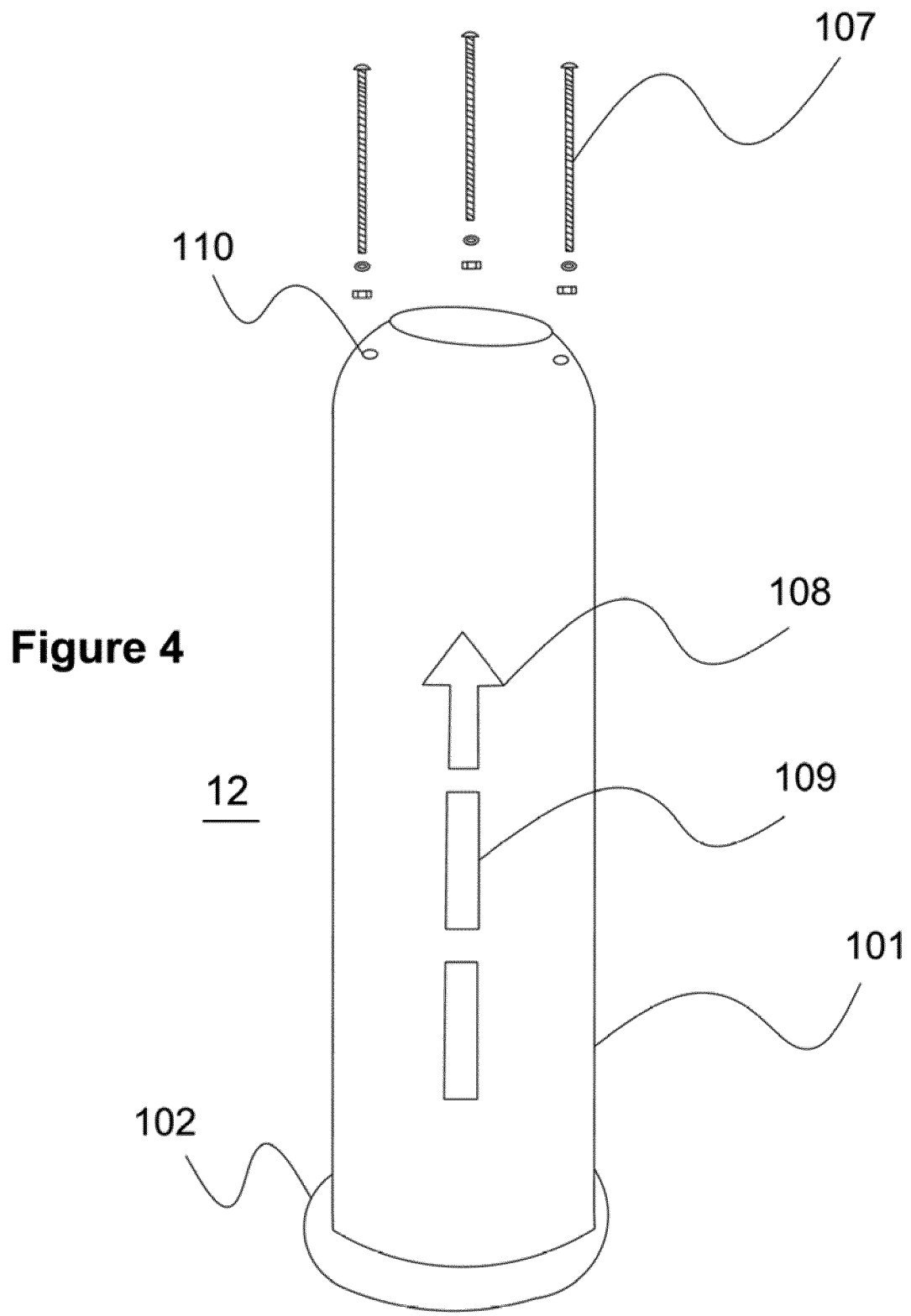
FIG. 4 is an exploded view showing a system according to an embodiment.

FIG. 4 is a partial exploded view showing a security system 12 according to an embodiment. The system 12 includes a housing 101, slots 108 and 109, and a lip 102. In at least one embodiment, the system 12 is implemented as a portable bollard. System 12 has a bottom-loaded configuration in which components may be inserted into the housing 101 from a bottom thereof, prior to the housing 100 being assembled with the lip 102. The housing 101 may be constructed from the same or similar materials as housing 100 discussed above. The housing 101 further includes a plurality of apertures 110. The apertures 110 are configured to receive therein fasteners 107 so as to secure one or more bottom-loaded inserts, as discussed in more detail below.

Figure 5:
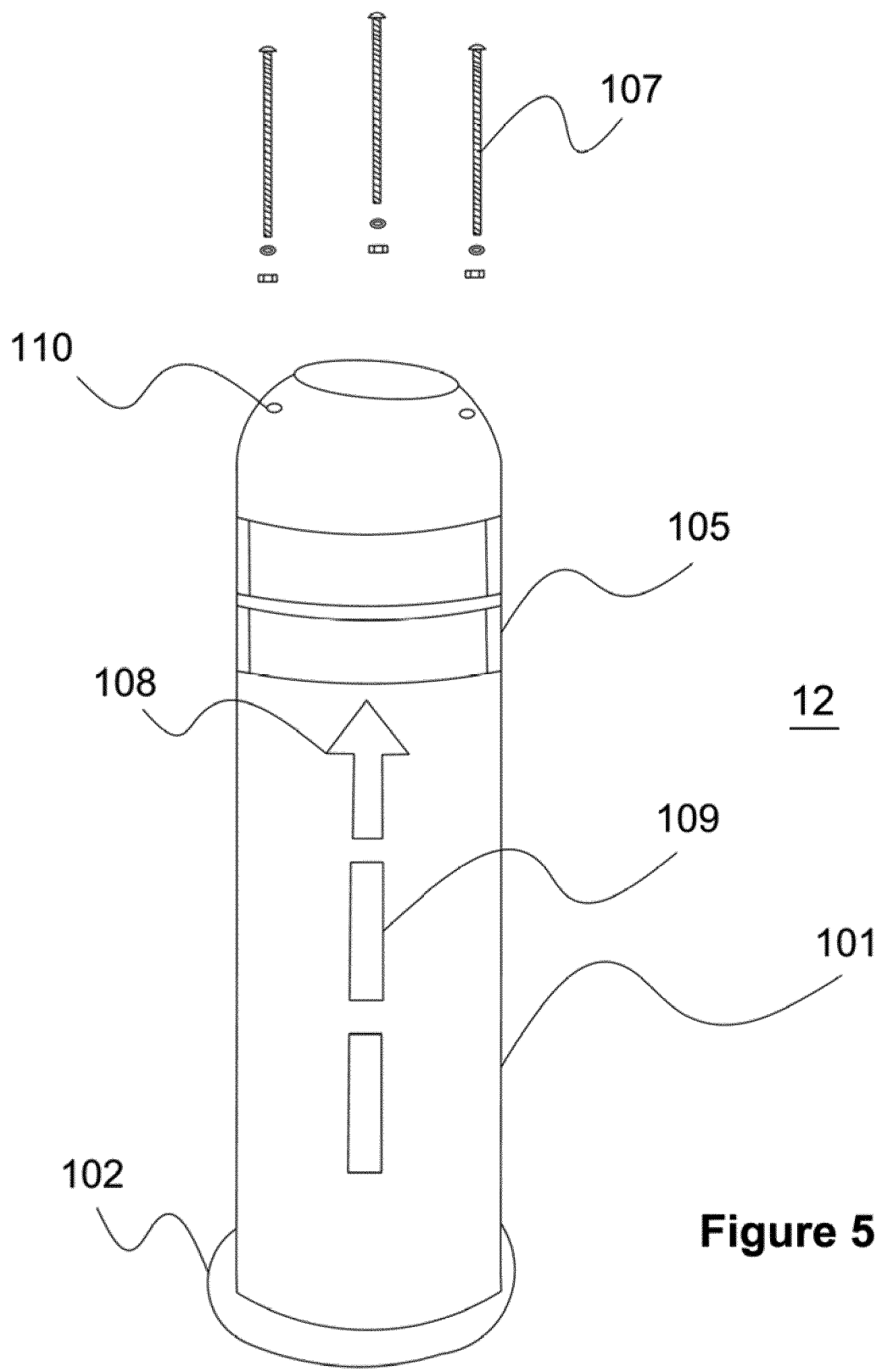
FIG. 5 is an exploded view showing components according to the embodiment shown in FIG. 4.

FIG. 5 is a partial exploded view showing system 12, which further includes openings 105 through which one or more inserts are visible from an exterior of housing 101. The openings 105 may include two openings stacked one on top of the other, each configured to receive an insert therein. In some embodiments, the two openings 105 may be positioned above slot 109, which in turn may be positioned above two or more slots 108.

Figure 6:
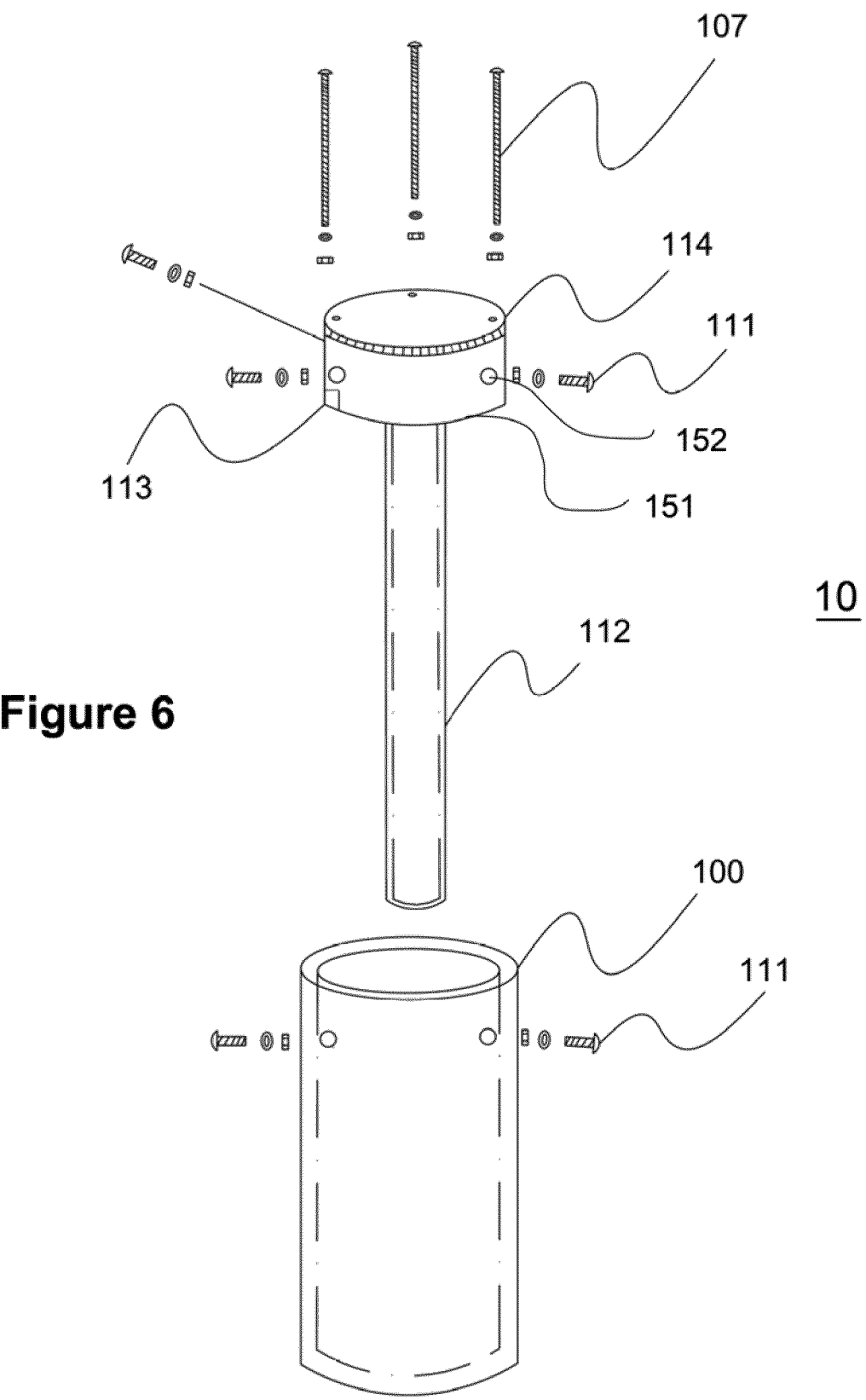
FIG. 6 is a further exploded view according to at least one embodiment.

FIG. 6 is a further exploded view showing a system according to at least one embodiment. In particular, FIG. 6 shows housing 100 as may be implemented in system 10 described above, together with additional components that may be included in systems 11, 12 or other systems in accordance with one or more embodiments. As mentioned above, the housing 100 is a top-loaded housing that may be constructed out of steel. As shown in FIG. 6, the housing 100 may be configured to receive therein fasteners 111 for mounting and securing components to the side of the housing 100. The fasteners 111 may include a bolt, washer and nut combination, for example.

The housing 100 shown in FIG. 6 is configured to receive therein a conduit 112. The conduit 112 may be a galvanized rigid conduit having a ¾" diameter, in at least one embodiment. The conduit 112 provides an internal housing for hard wiring components within housing 100. The conduit 112 provides further isolation and protection of components therein from the external environment, and may further provide for electromagnetic shielding. In at least one embodiment, one or more electrical connectors may be held within the conduit 112 to supply power to a plurality of inserts, as discussed in more detail below. In at least one embodiment, the conduit 112 may house a cable connected to a utility grid. The conduit 112 may house connectors including, but not limited to, fiber optic cables, copper wires, coaxial cables, etc.

The conduit 112 is formed as a cylindrical member and is connected at one end to a cap 151. The cap 151 may have one or more sensors inserted therein or mounted to a surface of the cap 151. For example, the cap 151 may include a tilt sensor 113 and a transmitter (not shown). The tilt sensor 113 may be an accelerometer. The tilt sensor 113 may be coupled to an alarm which is configured to output an alert notification (a warning notification) when the tilt sensor indicates that the system is tilted by more than a threshold tilt angle (more than 10 degrees, for example). In at least one embodiment, the alarm may emit an audible alert in the range of 110 dB or higher. The cap 151 may further be provided with one or more solar panels 114 attached. The one or more solar panels 114 receive solar energy to supply electricity to power the tilt sensor 113, among other components. The solar panels 114 and tilt sensor 113 may be secured to the cap 151 via one or more fasteners 111 that are inserted into one or more apertures 152 in the cap 151. In at least one embodiment, the solar panels 114 may be substituted with a rechargeable battery or a non-rechargeable battery, or such batteries may be provided together with the solar panels 114. In at least one embodiment, a lithium-ion battery may be used.

Figure 7:
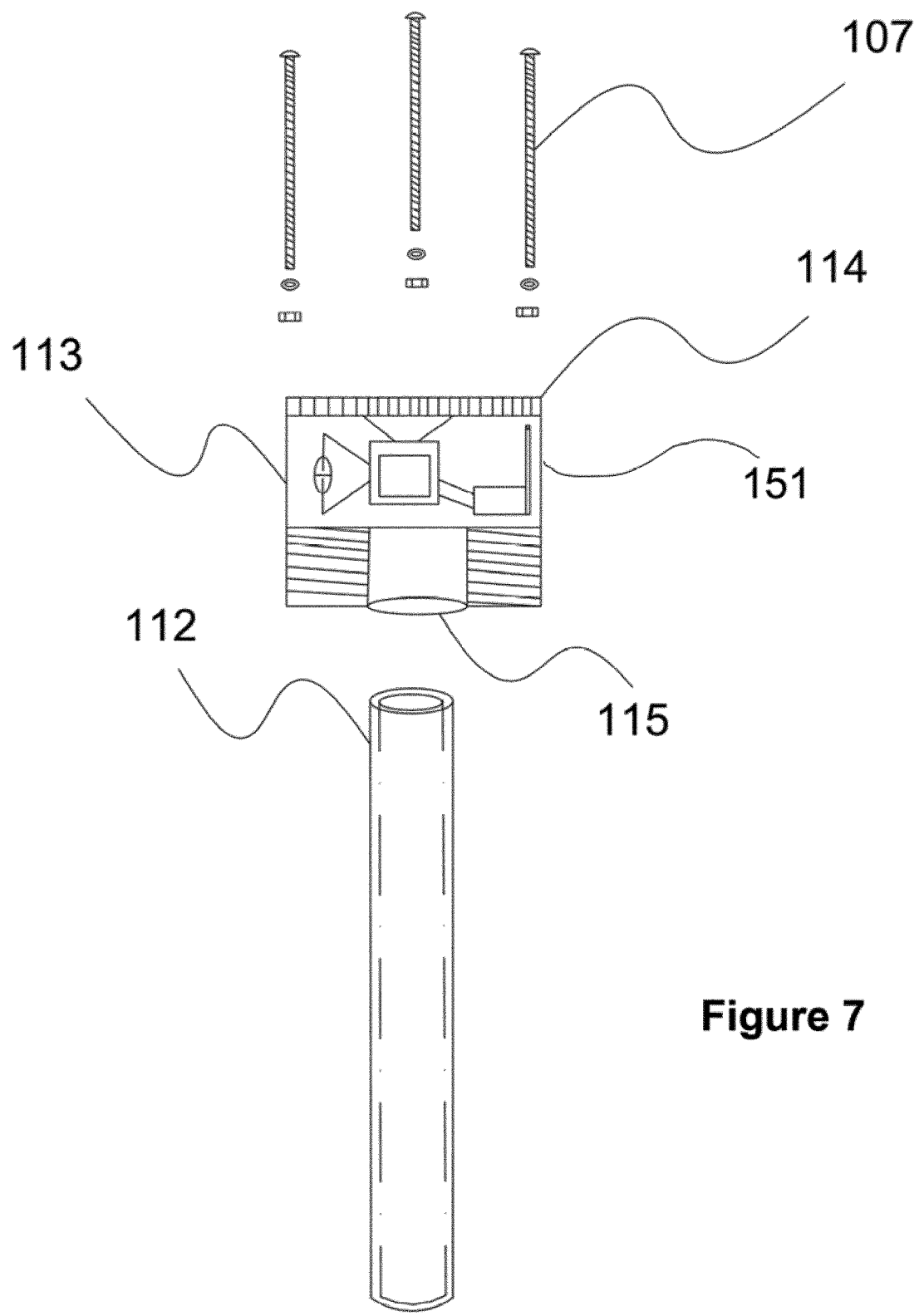
FIG. 7 is another exploded view according to at least one embodiment.

FIG. 7 is another exploded view according to at least one embodiment. FIG. 7 depicts an interface between conduit 112 shown in FIG. 6 and the cap 151. The cap 151 includes, at a lower portion thereof, a housing 115. The housing 115 is configured to receive the conduit 112, such that a top portion of conduit 112 fits within the housing 115 to secure the conduit 112 to the cap 151. The housing 115 may be formed as a hollow semi-cylindrical structure made of a metal or polymer material. Atop the housing 115, the tilt sensor 113 and/or transmitter may be positioned, with the one or more solar panels 114 disposed on an uppermost portion of the cap 151.

Figure 8:
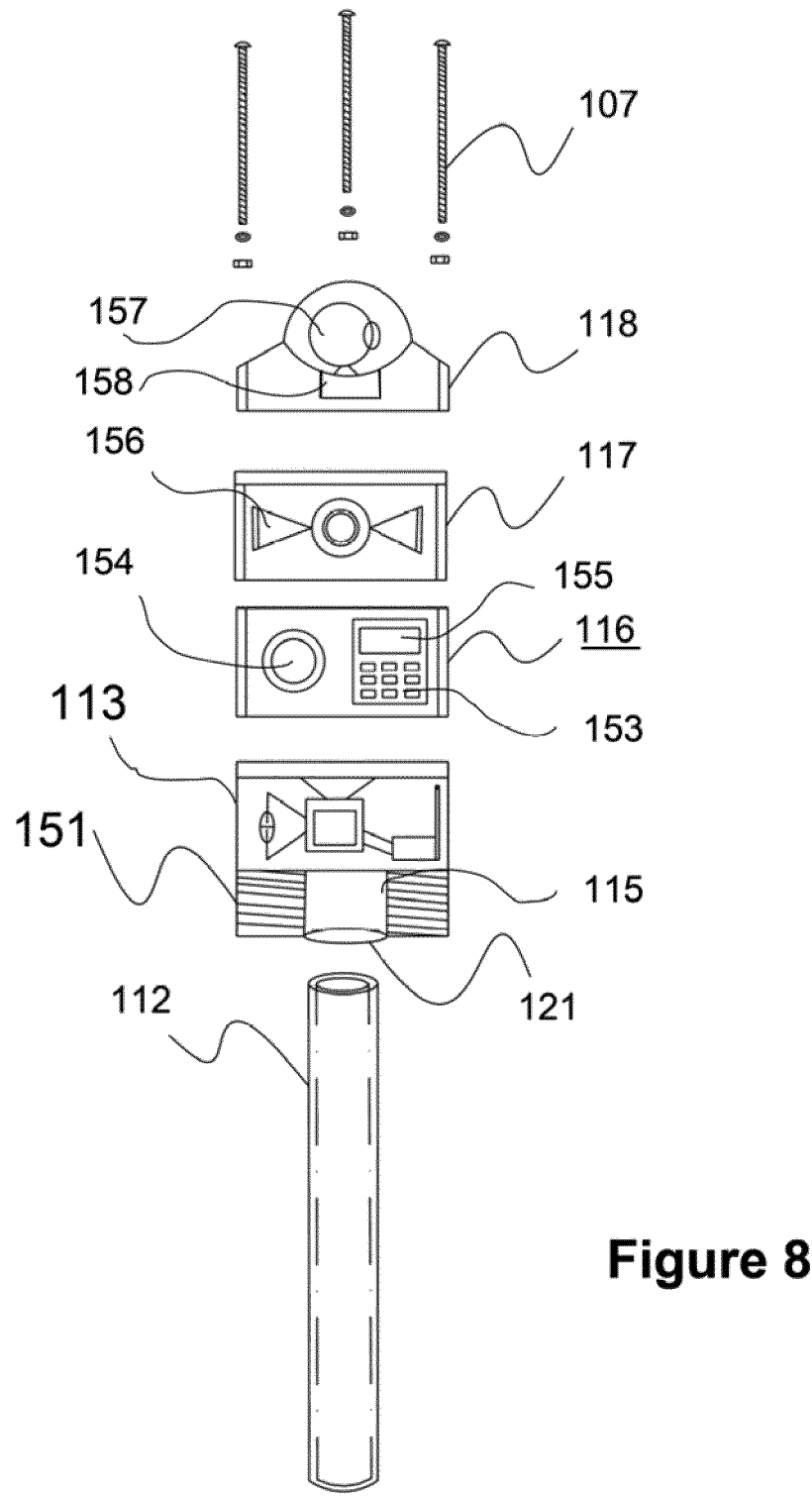
FIG. 8 is yet another exploded view according to at least one embodiment.

FIG. 8 is yet another exploded view according to at least one embodiment. FIG. 8 depicts an exemplary assembly of components that may be inserted in housings 100, 101. In particular, the components include a conduit 112 that is configured to be inserted into housing 115. More specifically, the housing 115 includes an opening 121 dimensioned to accommodate the conduit 112. The opening may be formed in the housing 115 by molding or machining techniques. The cap 151 may be further provided with the tilt sensor 113 and/or transmitter as described above.

In the exemplary embodiment shown in FIG. 8, a plurality of inserts are provided at positions above the conduit 112. The inserts include an emergency telecommunication module 116, an audiovisual module 117, and an imaging module 118. Each of the modules may receive power from the solar panels 114. Fasteners 107 may be used to secure the modules to sides of the housings 100, 101. Each of these modules will be described in more detail below. It should be understood that the arrangement of modules shown in FIG. 8 is exemplary and non-limiting, and that the modules may be substituted with other modules and may be provided in a different order from what is shown.

The emergency telecommunication module 116 includes a key pad 153, a push button 154, and a display 155. The key pad 153 allows for access to a telecommunications network and may include a standard ten digit/alphanumeric key pad entry. The push button 154, when depressed, activates a telecommunication signal within the module 116 that connects the telecommunication module 116 to an emergency services network, discussed in more detail below. The key pad 153 may be used to enter in a specific code, such as a user ID code or an over-ride code, to perform operations on the module 116. In at least one embodiment, telecommunication module 116 allows for two-way communication between a user physically present at the telecommunication module and a remote user. The telecommunication module 116 may further comprise a microphone through which a user can communicate. In at least one embodiment, the telecommunication module 116 may comprise noise-cancellation technology so that the user's voice can be more clearly heard and understood when transmitted through the microphone.

In some embodiments, the key pad 153 may be used to dial one or more telephone numbers associated with local, state and/or federal law enforcement entities, in addition to medical services. The display 155 may be used to show an address book of telephone numbers to be selected using the key pad 153. The display 155 may also display one or more messages. In at least one embodiment, the telecommunication module 116 may be provided with a stainless steel face over at least a portion thereof, while allowing the display 155 to be fully visible, and to allow unimpeded access to the key pad 153 and push button 154. In at least one embodiment, the push button 154 is illuminated by one or more light emitting diodes (LEDs) so as to be readily visible in dark or dim conditions.

The audiovisual module 117 includes a speaker configured to emit an emergency siren when activated by a controller (discussed below in more detail). In at least one embodiment, the siren may have an output of between about 100 W to about 200 W. The audiovisual module 117 may allow for one or two-way communication of emergency protocol messages. In at least one embodiment, the messages may be live or pre-recorded and output at a volume of about 50 dB or more.

In some embodiments, the audiovisual module 117 broadcasts emergency protocol messages received from a remote source. However, the audiovisual module 117 of other embodiments may broadcast emergency messages received from a remote source and may also serve as a source of messages to be broadcast. For example, a user may activate the push button 154 and the key pad 153 of the telecommunication module 116 to record an audio message that is then transmitted through the audiovisual module 117. In at least one embodiment, a user may enter a message using the key pad 153 that is converted from an alphanumeric input to an audible output by circuitry in the telecommunication module 116. The audiovisual module 117 is further configured with a plurality of LEDs 156 that are configured to output light that is controlled in pattern (e.g., strobing), intensity, color and duration. In at least one embodiment, the LEDs 156 may be used to permanently illuminate an area. In at least one embodiment, the LEDs 156 are configured to output light at 1800 Lumens or more. In at least one embodiment, one or more LEDs 156 may be provide invisible light, including but not limited to infrared or ultraviolet light.

The imaging module 118 includes an image sensor 157, such as a charge-coupled display device or closed circuit television (CCTV) camera. The image sensor 157 is configured to record images and video and may be communicated with a memory in order to store recorded data in the memory. In at least one embodiment, the image sensor 157 is configured to transmit the recorded data to a remote location, e.g., a server. The image sensor 157 and tilt sensor 113 described above collectively comprise a sensor suite. In some embodiments, the sensor suite may include additional sensors.

In some embodiments, the server and the image sensor 157 may be connected in a cloud-computing network. In this manner, the image sensor 157 may be used to provide a live image/video feed. The imaging module 118 further includes a battery 158. The battery 158 may be a backup battery to supply power to the image sensor 157, e.g., when the solar panels 114 do not supply sufficient power to the image sensor 157.

In some embodiments, the imaging module 118 may include an acrylic glass face to shield the lens of the image sensor 157. In at least one embodiment, the image sensor may rotate 360° and include night-vision functionality. For example, night-vision may be facilitated by providing the imaging module 118 with infrared lights. In at least one embodiment, the image sensor 157 may be configured to supply high definition video (e.g., 1080p HD video). In some embodiments, the field of view of the image sensor 157 may be ±140°.

Figure 9:
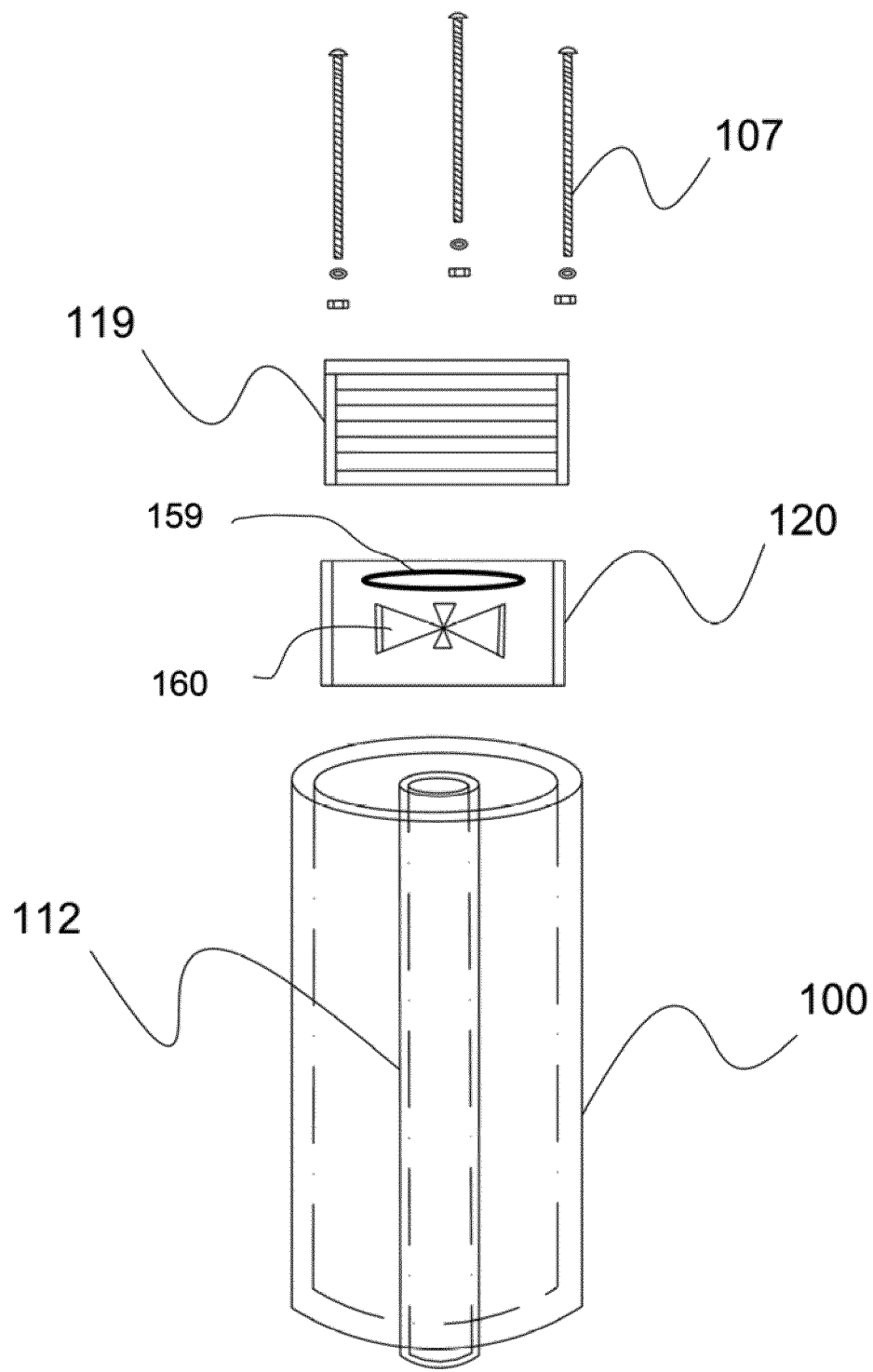
FIG. 9 is a further exploded view according to at least one embodiment.

FIG. 9 depicts additional exemplary inserts that may be provided in one or more embodiments. FIG. 9 depicts the housing 100 with the conduit 112 installed therein as described above. In addition, FIG. 9 depicts a motion sensor module 119 comprising a motion sensor. The motion sensor module 119 may be provided in addition to or instead of imaging module 118. The motion sensor module 119 may be configured to be supplied with power via the one or more solar panels 114. The motion sensor module 119 is configured to detect motion within a predetermined threshold from the motion sensor. For example, the motion sensor module 119 may be configured to detect movement of an object within 0-20 feet of the motion sensor.

In addition to the motion sensor module 119, the housing 100 may further house a high-intensity deterrent module 120. The high-intensity deterrent module 120 includes a high-intensity audible output (a speaker) 159 and a high-intensity light emitter 160. The high-intensity audible output is configured to output sound at a volume at a decibel range that is uncomfortable for persons, or animals in the vicinity of the output 159. For example, the output may emit sound at a decibel range of 90 dB-130 dB. The sound is not particularly limited to any pitch or vibrational frequency.

The high-intensity light emitter 160, which may include an array of LEDs, is configured to output light of an intensity that is uncomfortable for those in the vicinity of module 120. In some embodiments, the high-intensity light emitter 160 may be a strobe light configured with a flash energy of 10-150 joules and a flash power of 5-10 kW. In at least one embodiment, the high-intensity light emitter 160 may be controlled to output a powerful flash of light akin to that associated with a 'flash bang' grenade. Such a flash may impede persons and/or animals in the vicinity of the flash from continuing to advance toward a boundary.

In at least one embodiment, light emitter 160 represents a 'visual siren' that may be provided in a rotating housing (e.g., with a rotational range of 360°). In at least one embodiment, the light emitter 160 may be a halogen light, an LED, or a super-LED. In at least one embodiment, the light emitter 160 may output light of a plurality of colors, e.g., red, blue, and yellow. In at least one embodiment, the high-intensity lighting emitter 160 (a lighting device) is configured to be activated to illuminate a perimeter before, during or after a plurality of gas dispersal modules or water displacement devices are activated.

Figure 10:
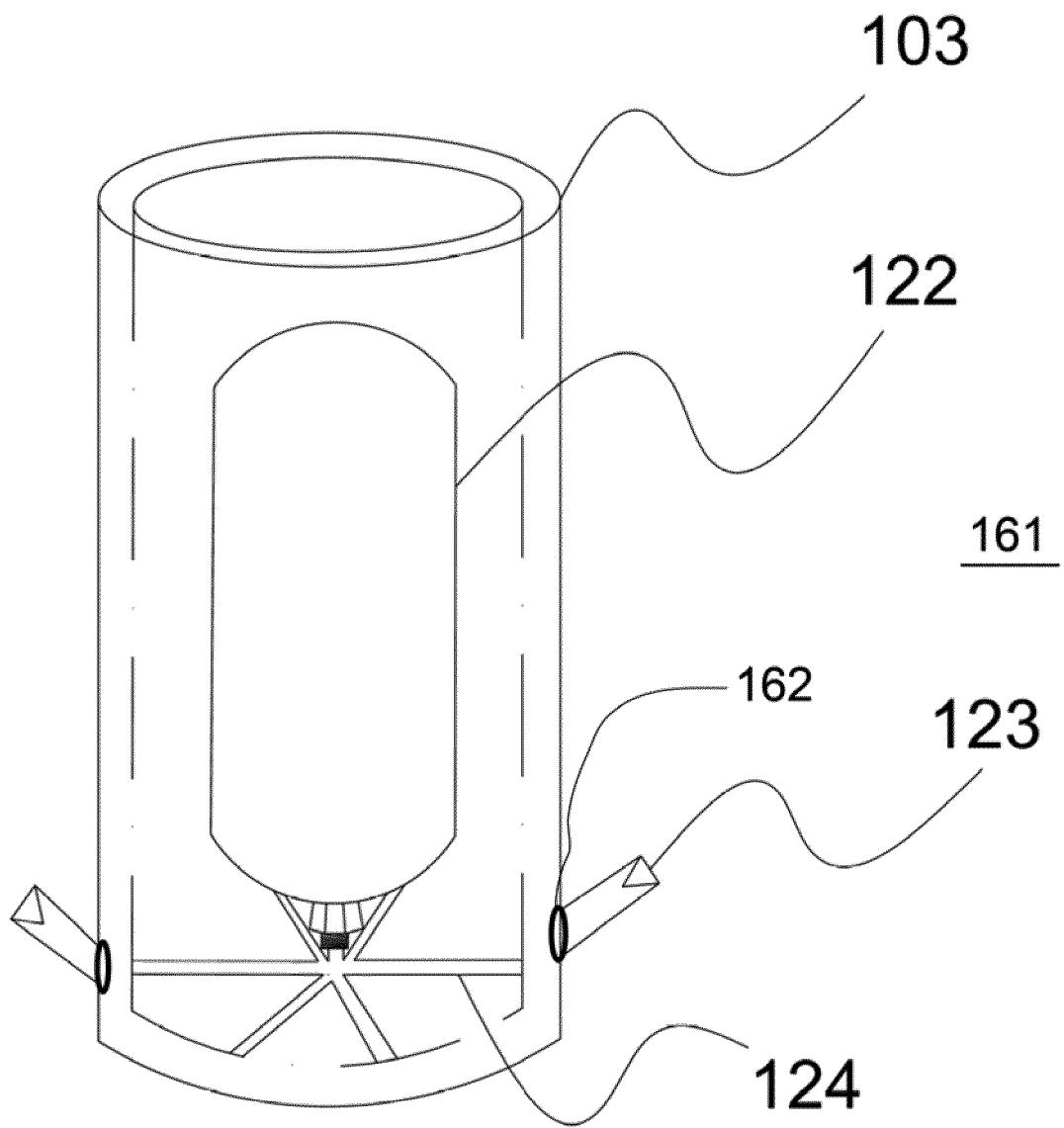
FIG. 10 is a schematic depiction of a portion of a system according to an embodiment.

FIG. 10 depicts a gas dispersal module 161 according to at least one embodiment. The gas dispersal module 161 may be fitted into a housing 103 that is similar to the housings 100, 101 discussed above, but which further includes at least one aperture 162 to allow gas to exit the housing 103 through one or more nozzles 123. More particularly, the housing 103 has one or more of the apertures 162 on one or more sides, and each aperture 162 is dimensioned to accommodate a nozzle 123.

The nozzles 123 eject gas from a tank 122. In at least one embodiment, the tank 122 is an aluminum tank that is connected to tubing 124, and the tubing 124 is in turn connected to one or more of the nozzles 123. The tank may be refillable and/or replaceable. In at least one embodiment, the tubing comprises corrugated stainless steel tubing. In at least one embodiment, the gas is a lachrymal agent (tear gas) that causes tearing and irritation. Further, in at least one embodiment, the gas dispersal module 161 may be arranged as a 'drop-in' unit that is pre-assembled and can be readily loaded into the housing 103. Each nozzle 123 comprises a gas emitter configured to eject gas in a direction toward an object in the vicinity of the system 10, 11, 12. The nozzles 123 may be controlled to eject gas when the object is within a predetermined distance (e.g., 5 or 10 feet) from the system. In at least one embodiment, a law enforcement officer may be summoned to the site where the security system is located and may deploy lachrymal agent from a standalone device.

Figure 11:
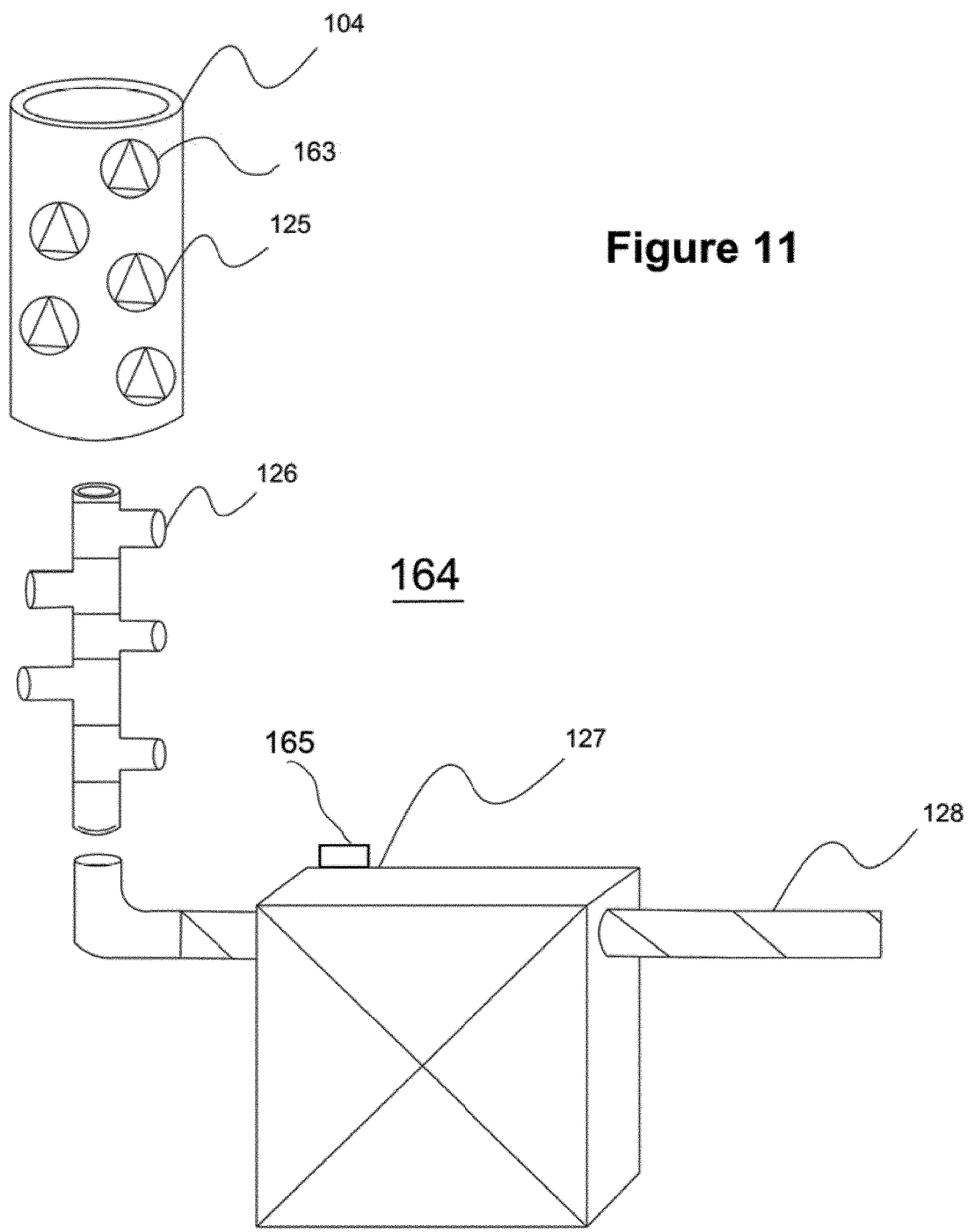
FIG. 11 is a schematic depiction of a system according to an embodiment.

Further, in at least one embodiment, additional dispersal of gas and/or other fluids may be accomplished. FIG. 11 is a schematic depiction of a system according to an embodiment. The system includes a housing 104 that is similar to the housings 100, 101, 103 discussed above, but which further includes one or more apertures 163. The one or more apertures 163 may be machined in the side of the housing 103. One or more of the apertures 163 is dimensioned to accommodate a nozzle 125. The nozzle 125 is a high-pressure liquid displacement nozzle. The nozzle 125 ejects fluid which is supplied though a passage 126 from a pump 127. In at least one embodiment, the passage 126 is a copper elbow fitting. The passage 126 is constructed so as to withstand pressure in a range of about 30-150 psi. The passage 126, pump 127 and piping conduits 128 collectively form a water displacement device (a water displacement module) 164.

The pump 127 is configured to pump fluid to through the passage 126 for ejection through the nozzles 125. More specifically, the pump 127 is configured to receive fluid (e.g., groundwater) from piping conduits 128. The piping conduits 128 may be made of PVC, in at least one embodiment. In at least one embodiment, the piping conduits 128 may extend underground toward a perimeter from a fluid source so as to channel water to systems located at the perimeter. In at least one embodiment, conduit 128 from a first system 10, 11, 12 may be connected to conduit 128 of another system, so as to form a network of conduits. An electromagnetic valve may be used to switch the supply of fluid from the pump 127 to the nozzles 125 on and off. The electromagnetic valve may be configured to be controlled by control circuitry located in the housing 104 and/or remotely. In at least one embodiment, the pump 127 may be controlled by an automated wireless pump control at a central command location, as discussed further below.

In at least one embodiment, the pump 127 may be controlled by a controller 165, which may include a programmable integrated derivative (PID) control. The controller 165 is configured to cause the pump 127 to output fluid and to control a pressure of the outputted fluid to be within a desired range, e.g., 20-40 psi, 40-60 psi. When an object reaches a first threshold distance, the controller may cause the pump to output fluid at a higher pressure than before the object reaches the second threshold distance. In other words, a lower pressure may be output when the object is between a second threshold and a first threshold, and a higher pressure may be output when the object is past the first threshold and closer to the individual system where pump 127 is located.

In some embodiments, the controller 165 is configured to control other components of systems 10, 11, 12. For example, the controller 165 may be configured to control operation of the image sensor 157 by providing a command to the image sensor. The controller 165 may include a processor and a computer readable medium configured to store instructions, which, when executed by the processor, cause the controller 165 to carry out program operations.

Further, in at least one embodiment, the controller 165 includes a facial recognition program and is configured to process image data collected by image sensor 157 to identify individual subjects. In at least one embodiment, controller 165 is configured to transmit subject identifier information, including biometric information as identified by the facial recognition software, to a network. Thus, the controller 165 and the image sensor 157 serve as a portable 'identifier' of subjects detected by the image sensor 157. For example, when the facial recognition program identifies a subject detected by image sensor 157, the facial recognition program is configured to communicate biometric information such as a subject's name, estimated age, height, estimated weight, racial or ethnic descriptors, eye color, iris information, and the like.

In some arrangements, the controller 165 includes a data transceiver that may be a wireless data transceiver, such as a WiFi data transceiver, a Bluetooth data transceiver, a cellular data transceiver (e.g., a 2G data transceiver, a 3G data transceiver, a 4G data transceiver, etc.). For example, the controller 165 may be configured to transmit data wirelessly (e.g., over the Internet) to a central computing unit 166 discussed below. In some embodiments, controller 165 may carry out encrypted communication using encryption techniques such as the triple data encryption standard (DES) or advanced encryption standard (AES).

The above-described components may be integrated into a perimeter security system according to one or more embodiments. More particularly, each of the systems 10, 11, 12 may be configured as a 'smart' bollard or 'intelligent' bollard with sensing and responsive capabilities as achieved by the modular inserts described above. A plurality of any of such systems 10, 11, 12, taken in any combination, may collectively form a security system as may be disposed around one or more perimeter areas. Each of the systems 10, 11, 12 may be configured to maintain an object relative to a predefined boundary, as described below.

For example, a plurality of systems (e.g., one or more of systems 10, 11, 12 or any combination thereof) may be arranged as part of a network 150 of bollards. Each individual system 10, 11, 12 within the network 150 may be considered an individual bollard node 140 in the network. Each one of the systems 10, 11, 12 may include a water displacement module 164. The water displacement devices include the pump 127 which may be controlled by a local and/or remote controller (e.g., a control unit configured to be controlled via network 150) to output fluid when an object is within a first predetermined distance from the boundary (e.g., 30 feet from the system where the pump 127 is disposed).

In addition, each system 10, 11, 12 may further include a plurality of light sources configured to emit light toward the object when the object is within a second predetermined distance from the boundary. The light sources include, but are not limited to, the high-intensity light emitter 160 of the high-intensity deterrent module 120 and the plurality of LEDs 156 of the audiovisual module 117. In some embodiments, the second predetermined distance may be the same as the first predetermined distance or a different distance. For example, the second predetermined distance may be a closer distance (i.e., a shorter distance to the respective individual system or node 140 containing the light sources) than the first predetermined distance. In some embodiments, the second predetermined distance may be a specified percentage or increment from the first predetermined distance. In at least one embodiment, the second predetermined distance may be, for example, ten feet less than the first predetermined distance.

Further still, in at least one embodiment, each system 10, 11, 12 may additionally include an auditory system configured to emit an audible output when the object is within a third predetermined distance from the boundary. For example, the auditory system may include one or more of the high-intensity audible output 159 of the high-intensity deterrent module 120 and a speaker of the audiovisual module 117. In some embodiments, the third predetermined distance may be the same as one or both of the first predetermined distance or the second predetermined distance, or may differ from one of the distances but not the other. For example, the third predetermined distance may be a closer distance (i.e., a shorter distance to the respective individual system or node 140 containing the light sources) than the second predetermined distance. In some embodiments, the third predetermined distance may be a specified percentage or increment from the second predetermined distance. In at least one embodiment, the third predetermined distance may be, for example, ten feet less than the second predetermined distance.

In at least one embodiment, motion sensor 119 is controlled by a controller (e.g., controller 165 discussed below). When the controller determines that an object (e.g., an organism such as a person or animal) ceases movement toward a boundary (e.g., toward the bollard having housing 100), the controller may adjust the first, second, and third predetermined distances in response to the determination. The controller may adjust two or more of the first, second and third predetermined distances uniformly, e.g., a reduction or increase by a fixed amount, or may adjust two or more of the distances in a varying manner. For example, if the controller 165 determines that a first threshold has been passed or traversed by an object, the controller may shorten the second and third predetermined distances by an equal amount.

Additionally, in at least one embodiment, each system 10, 11, 12 may further include a visual sensor configured to obtain images or video of at least a portion of the predetermined boundary and to transmit the images or video to a location other than the predefined boundary. For example, the visual sensor may be the image sensor 157 which is configured to record both photo and video data. When the system 10, 11, 12 is installed as a point along a boundary (e.g., as a bollard along a perimeter), the field of view of the image sensor 157 encompasses at least a part of the boundary. The image sensor 157 may be configured to upload the recorded data in a wired or wireless manner to a processing unit, as discussed in more detail below.

As apparent from the foregoing discussion, each system 10, 11, 12 may include a plurality of devices which may be controlled independently or together to aid in both perimeter control and emergency response. For example, through deploying audiovisual deterrents, liquid deterrents (e.g., high pressure water), and a gas deterrent (e.g., tear gas), an object or an organism (e.g., a person or an animal) may be deterred from approaching closer to the system. The aforementioned deterrents (audiovisual, high pressure fluid, gas) may be considered 'active' deterrents. It should be noted that none of the modules are intended to apply lethal force, but rather provide for humane or non-lethal modes of deterrence.

Each of the systems 10, 11, 12 may be 'activated,' e.g., by turning on the imaging sensor 157, turning on one or more of the aforementioned lighting systems, turning on one or more of the gas dispersal or liquid dispersal modules, or providing an audiovisual output, for example, in response to one or more stimuli. A first stimulus may correspond to an object being detected at a predetermined distance from the system (e.g., at a first threshold). A second stimulus may correspond to the object being detected at another predetermined distance (e.g., at a second threshold that is closer than the first threshold). Activation of select modules within the systems 10, 11, 12 may be controlled so as to achieve 'staggered' response of successively increasingly deterrence effects. For example, in response to the first stimulus, a security system 10 may expand from a retracted to an extended position. In response to the first stimulus or another stimulus, the water displacement devices may be controlled to turn from an on state to an off state in response to a communication from a central computing unit 166 discussed below. A fluid deterrent may be outputted at a higher pressure when a subject is a distance from the boundary that is less than the first predetermined distance. The dispersal of lachrymal agent may be controlled to be delayed as a final response, after an object continues to approach a perimeter (e.g., at a second predetermined distance), according to at least one embodiment. In some embodiments, the central computing unit 166 may allow for voice activation of one or more modules. Further, the central computing unit 166 may cause an audible output to be issued (e.g., with instructions or a warning) when a third predetermined distance is reached by the object. Further, the central computing unit 166 may cause a deterrent that has been activated at a first predetermined distance (e.g., water displacement module 164) to turn from an on state to an off state when an object has already reached and traversed both a first and a second predetermined distance.

Figure 12:
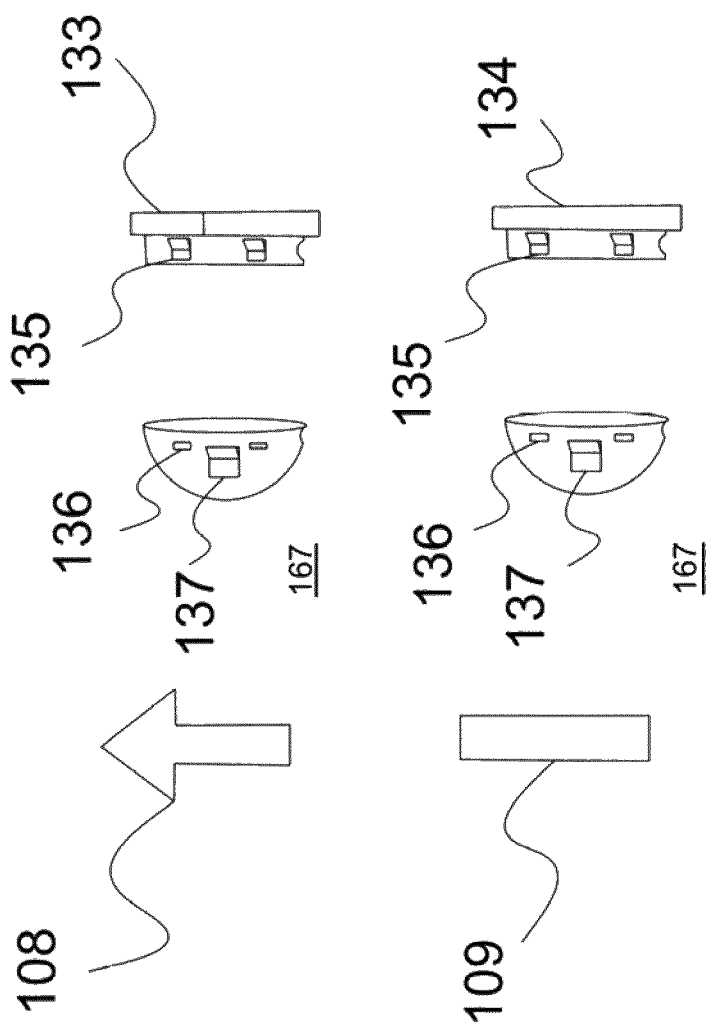
FIG. 12 depicts components of a system according to an embodiment.

Additionally, informational and/or passive cues may also be provided by the systems 10, 11, 12 to aid in emergency response control and management. FIG. 12 depicts components of a system according to an embodiment which allows for passive communication through the use of visual indicators. For example, the systems 10, 11, 12 include reflective indicators, such as reflective material in the slots 108, 109 described above. In at least one embodiment, the arrow-shaped slot 109 containing reflective material may be provided with a first cover part 133 in which one or more raised plastic tabs 135 may be present to secure the reflective material in place. The raised plastic tabs 135 are configured to fit into a notch 136 provided in a second cover part 167 that fits over the first cover part 133. Further, in at least one embodiment, the slot 108 may be provided with a first cover part 134 in which one or more raised plastic tabs 135 may secure the reflective material in place and fit into notch 136 provided in second cover part 167. In at least one embodiment, the reflective material in slots 108, 109 may be used to signal a direction (e.g., with a directional arrow as in slot 109) to indicate to hearing-impaired individuals that they should move in the direction corresponding to the arrow.

Figure 13:
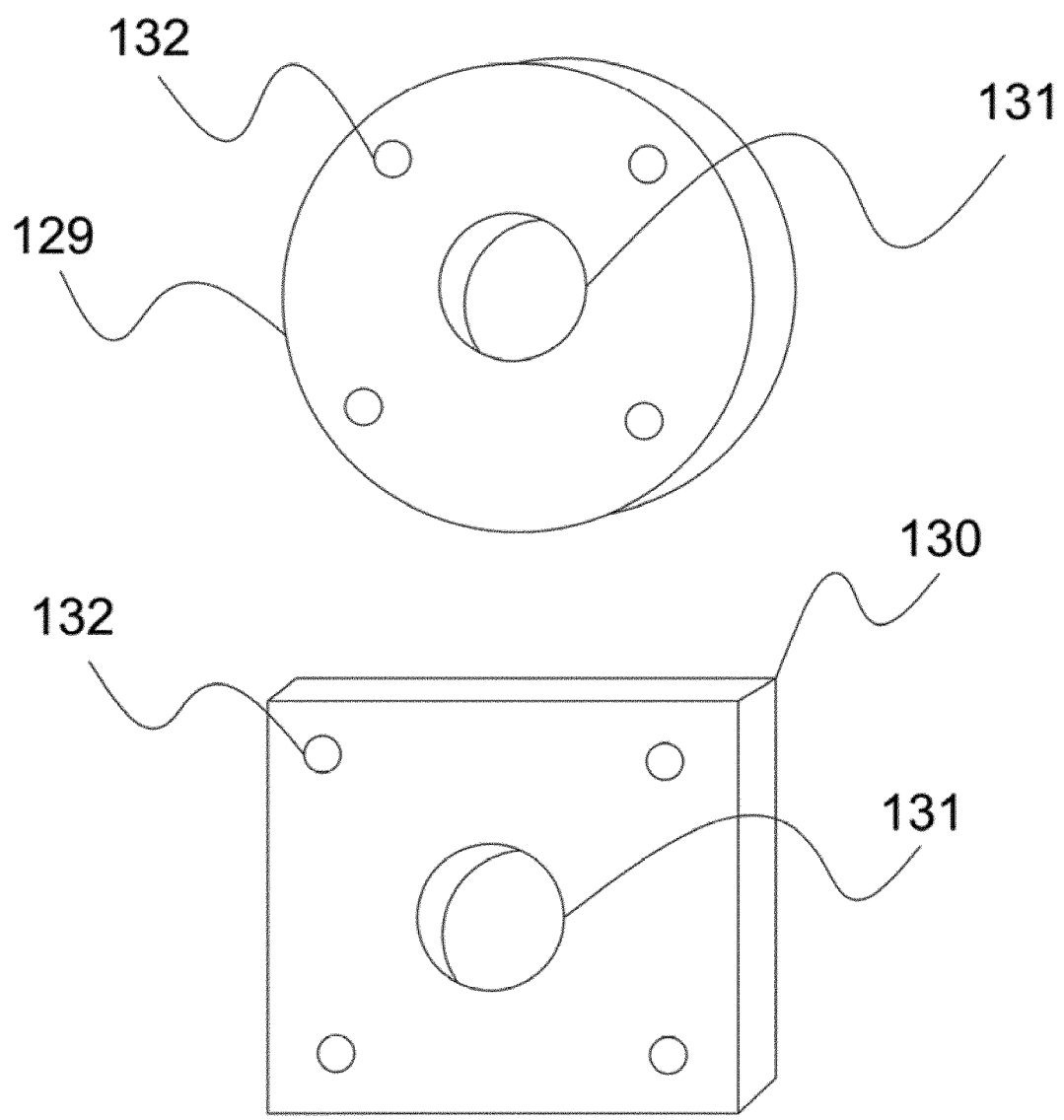
FIG. 13 depicts components of a system according to an embodiment.

FIG. 13 depicts components of a system according to an embodiment. As mentioned above, each system 10, 11, 12 may be implemented as a portable bollard. A network of bollards 150 described below, may be formed from a plurality of any combination of such systems. In at least one embodiment, individual nodes 140 (corresponding to individual bollards) may be arranged at intervals (e.g., every twenty feet, every fifty feet) along a perimeter. In some embodiments, the bollards may be configured so as to be readily portable and movable to create or re-define perimeters.

It is therefore advantageous to install the bollards in a way that they can be readily movable in an efficient manner. Accordingly, in at least one embodiment, an individual system 10, 11, 12 is provided with a base plate 129. In at least one embodiment, the base plate 129 is made of steel and formed in an annular shape, and may be formed of steel that is approximately 12" diameter and ½" thick. In at least one embodiment, the base plate 129 includes an aperture 131 configured to receive the lip 102 of the housing 100, 101, 103, 104. In at least one embodiment, the base plate 129 includes a plurality of openings 132 machined therein through which fasteners (e.g., bolts) may be used to secure the base plate 129 to the ground. For example, ½" bolts may be used to secure the base plate 129 to the ground. In another embodiment, a base plate 130 may be employed, which is square, in contrast to the annular base plate 129. The base plate 130, as with the base plate 129, includes a plurality of openings 132 to allow for fasteners to connect the base plate 130 to the ground, in addition to an aperture 131 to receive the lip 102.

Figure 14:
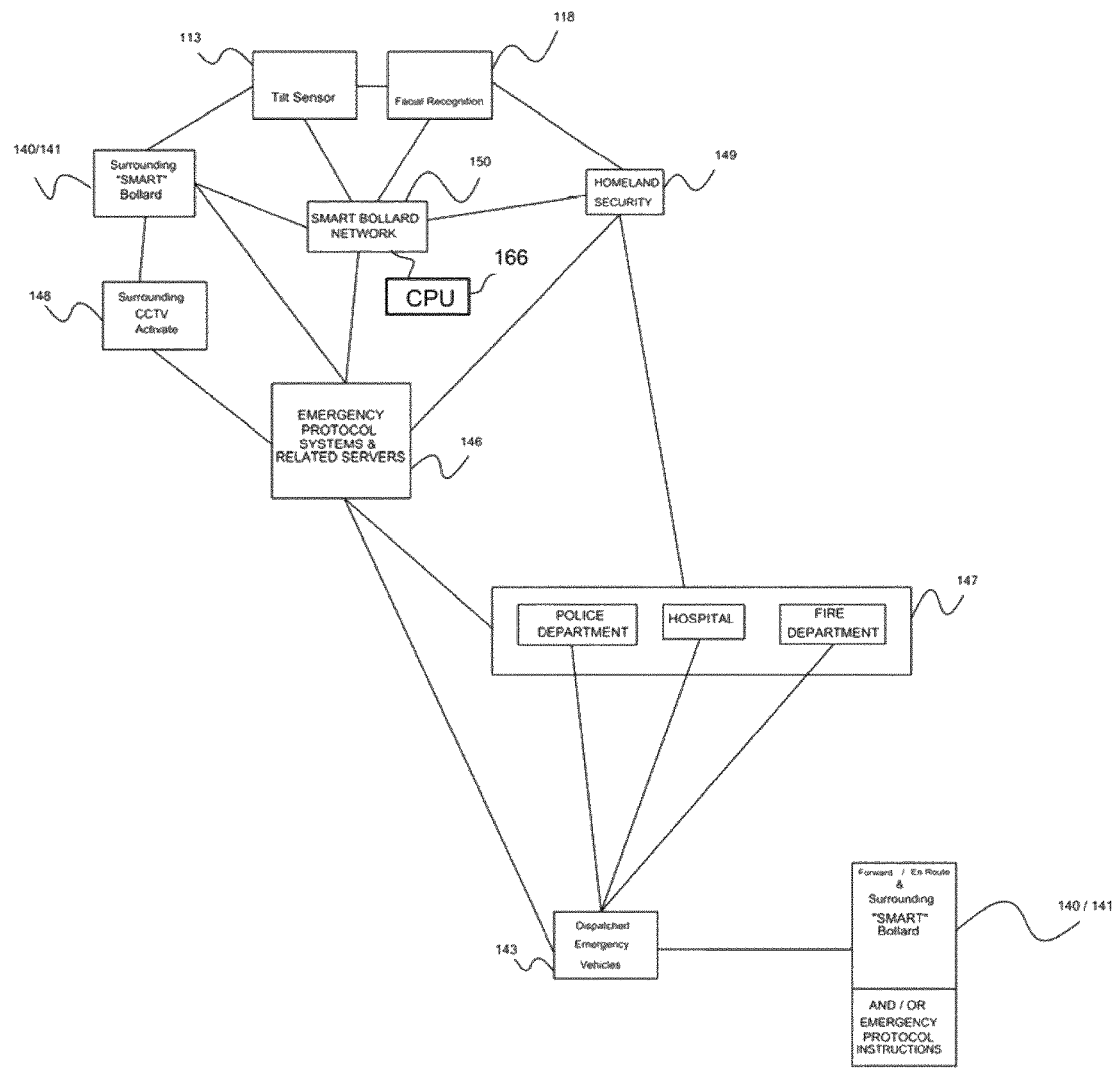
FIG. 14 depicts an integrated system according to an embodiment.

FIG. 14 depicts an integrated system according to an embodiment. The system comprises a network 150 of individual nodes 140 corresponding to individual systems 10, 11, 12. In some embodiments, two or more nodes may be physically connected by a removal railing 141. The removable railing 141 may be a metal connector which can be bolted to each bollard so as to establish a physical perimeter. For example, the physical perimeter may be established to carry out crowd control of persons, to carry out control of bicycle riders, to carry out traffic management, and the like. Further, in at least one embodiment, one or more nodes 140 may be placed in or adjacent to a jersey barrier or other barrier.

Further, the nodes 140 may be connected wireless to a central computing unit 166 with which they are configured to communicate. That is, each node may be in wireless communication via a wireless transmitter/receiver to transmit to and receive data from the central computing unit 166. The central computing unit 166 may include a processor and a computer readable medium. The central computing unit 166 may further include a timing program to control individual modules in accordance with a timer. In some embodiments, the central computing unit 166 includes a wireless data transceiver, such as a WiFi data transceiver, a Bluetooth data transceiver, a cellular data transceiver (e.g., a 2G data transceiver, a 3G data transceiver, a 4G data transceiver, etc.). The central computing unit 166 is configured to communicate with one or more nodes 140 and with entities other than the network 150. The central computing unit 166 may serve as a remote monitor that receives information from a plurality of nodes 140, e.g., by acquiring a video feed from the image sensor 157 of each node.

The central computing unit 166 is configured to receive information from the accelerometers 113 of a plurality of nodes 140, and to run facial recognition algorithms on imaging data received from the imaging modules 118 of a plurality of nodes 140. The facial recognition algorithms may include, for example, algorithms programmed to adjust for low-profile imaging taken by the imaging module 118 (given the height of the bollards in which they are positioned) and to account for subject identification parameters such as aging and reconstructive surgery. The algorithms executed by computing unit 166 and/or controller 165 are not limited to facial recognition algorithms, however.

Additionally, the central computing unit 166 may also communicate with existing CCTVs 148 from systems other than the systems 10, 11, 12 (e.g., CCTV systems which are not provided with smart bollards, but may be installed elsewhere). Further, the central computing unit 166 may be configured to communicate with a computing system 149 belonging to the U.S. Department of Homeland Security and/or a computing system that is an emergency protocol system 146 and/or servers related to the same.

Further, the central computing unit 166 may be configured to communicate with the computing systems of one or more intelligence and/or counterterrorism agencies or to be accessible thereto. That is, in at least one embodiment, the servers, hard drives, computer programs, hardware, software, and middleware of one or more law enforcement, intelligence, counterterrorism and other national security organizations of the state or federal government may access data from the central computing unit 166.

In particular, in at least one embodiment, the central computing unit 166 may be communicated through the computing system 149 with a local response network 147. The local response network 147 includes one or more emergency response units such as police departments, hospitals, and fire departments, for example. The local emergency response network 147, in turn, may be communicated with vehicles in a fleet of emergency vehicles 143 that may be dispatched in response to information received from the computing unit 166 and transmitted through the emergency protocol system 146 to the local response network 147. In at least one embodiment, the fleet of emergency vehicles 143 may include one or more autonomous vehicles. One or more of the vehicles may be equipped with GPS technology so as to enable real-time tracking of the vehicles and may have specific vehicle identifiers (e.g., a fleet number, fleet operator, license plate, etc.) that are communicated through the local response network 147.

Further, the individual nodes 140 may be configured to output an audiovisual indication that one or more vehicles 143 has been dispatched in response to information received from the system 146 and/or network 147. Further, in response to such information, the nodes 140 may be configured to output audible emergency protocol instructions, e.g., to instruct civilians to shelter in place, for example, or to travel to a direction indicated by a recorded or live message and/or a direction indicated by arrow 109. The nodes and/or central computing unit 166 are not limited in terms of frequency range or communication mode for carrying out communication with other entities.

Figure 15:
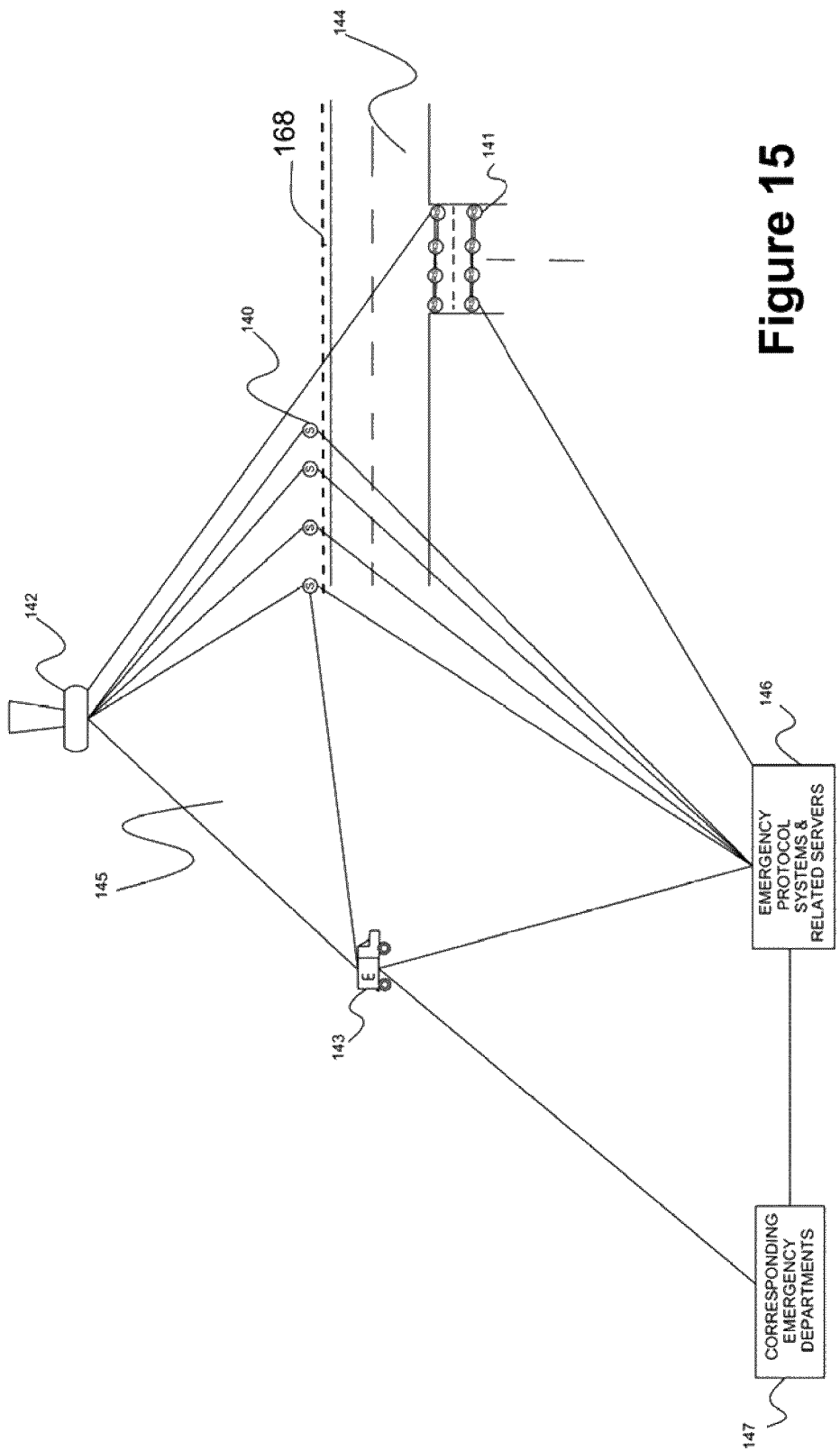
FIG. 15 depicts an integrated system according to an embodiment.

FIG. 15 depicts an integrated system according to an embodiment. The integrated system includes a plurality of nodes 140, at least two of which are connected by a railing 141 to establish a physical boundary. In at least one embodiment, the nodes 140 connected by railing 141 are disposed adjacent to a road or right-of-way 144. In at least one embodiment, the nodes 140 may be used to establish a crosswalk for pedestrians to transit. The railing 141 may aid visually-impaired or pedestrians with limited mobility in transiting the crosswalk.

Emergency vehicles 143 may be dispatched along the road or right-of-way 144 in response to information transmitted by nodes 140 via satellite communication to a global positioning satellite (GPS) system 142. The GPS system 142 may be configured to communicate with the central computing unit 166, the local emergency response network 147, and the emergency protocol system 146, among others.

Figure 17:
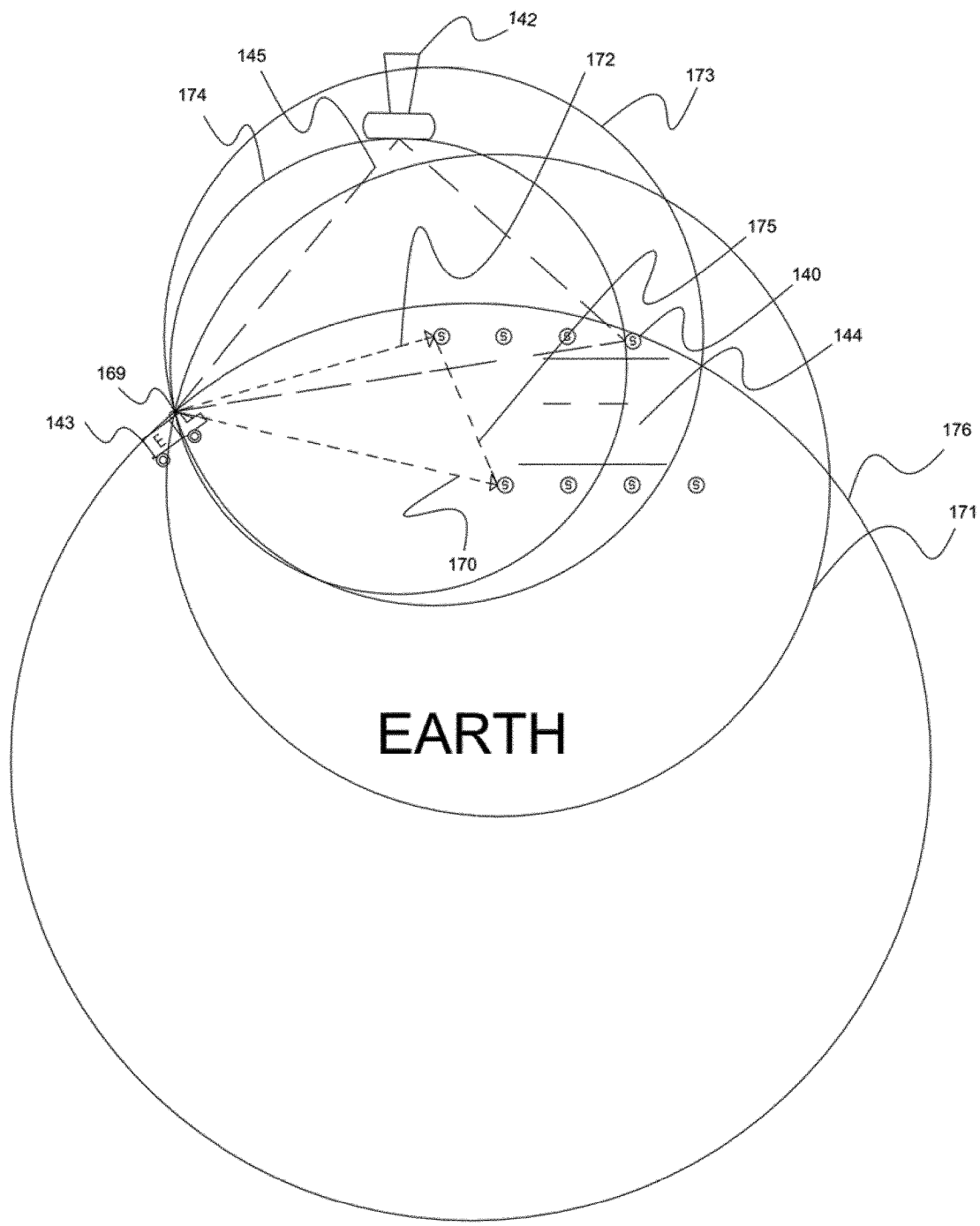
FIG. 17 depicts aspects of a system according to an embodiment.

FIG. 17 depicts aspects of a system allowing for triangulation according to an embodiment. In at least one embodiment, the GPS 142 may utilize the individual nodes 140 as a ground station for carrying out trilateration to transmit and receive data. In at least one embodiment, the nodes 140 may be used for aerial coordination/targeting. In at least one embodiment, the nodes 140 may be used in coordination with GIS systems as survey location markers or geodetic monuments having known ground elevations. In at least one embodiment, the nodes 140 may be used for horizontal alignment or as a triangulation station. Triangulation may be performed based on light reflected from an electronic measuring device 169. In at least one embodiment, the electronic measurement device 169 may be positioned on top of a driverless vehicle or an emergency vehicle from the fleet 143. The reflected light is used to produce triangulation spheres and/or circles. More particularly, the GPS 142 uses the earth 176 as a sphere and/or circle for triangulation purposes. In this manner, the GPS 142 provides ground based positioning for vehicles and driverless vehicles. In at least one embodiment, the GPS may be used in lieu of, or in conjunction, with a GPS that may be provided in a device already integrated with the vehicle communication system or provided on a device used by a driver (e.g., a cellular phone).

More particularly, a vehicle traveling along a road or right of way 144 may utilize the electronic measurement device 169 at the intersection of one or more triangulation circles or spheres in a trilateration area 145. The trilateration area 145 is an area in which a plurality of nodes 140 each serve as a ground station for GPS satellites to transmit and/or receive data. The electronic measurement device 169 may use reflected light to determine a distance 170, and then define a triangulation circle or sphere 171 based on the determined distance 170. Further, the reflected light may be used to determine a distance 172 that is less than, greater than or equal to the determined distance 170, according to certain embodiments. A further resulting triangulation circle or sphere 173 may be defined based on the determined distance 172. Additionally or alternatively, a triangulation circle or sphere may be determined based on measurements taken within trilateration area 145 and/or based on the determined distances 170, 172.

In at least one embodiment, the nodes 140 may be used for horizontal alignment of one or more autonomous vehicles (driverless vehicles) or as one or more triangulation stations for such vehicles. In at least one embodiment, the nodes 140 may communicate to the one or more autonomous vehicles to provide an offset distance to a boundary. The boundary may be, in one or more embodiments, a painted road line, a curb, a Jersey barrier, a guardrail, or a gutter, for example. In some embodiments, the boundary may be a virtual line 168, discussed below. Where the vehicle is an autonomous vehicle, the nodes 140 may communicate wirelessly with the autonomous vehicle or a controller thereof (such as an in-vehicle controller in communication with the controller 166). The autonomous vehicle may be controlled so as to be directed to the virtual line 168 by a command from a controller based on information received from one or more nodes 140. In some embodiments, the autonomous vehicle is controlled to travel so as to reach the virtual line within a predetermined period (e.g., 15 seconds after receiving an input instructing the vehicle to move toward the virtual line 168), so as to quickly attain a commanded position. The autonomous vehicle may be controlled to approach a bollard which is transmitting information (e.g., biometric information of identified subjects).

In yet another embodiment the reflective material used in slots 108, 109 may be used to reflect light such that the one or more autonomous vehicles may use the reflected light for triangulation. Further, the reflective material may aid in trilateration. In at least one embodiment, the reflective material used in slots 108, 109 may be used as a 'retro-reflector' configured to be employed with an electronic distance measurement device in one or more autonomous vehicles. The electronic distance measurement device may use light reflected from the reflective material as part of a triangulation process, for offsets to demarcation lines such as the painted lines, curb, Jersey barrier guardrail, or gutter mentioned above. Further, in at least one embodiment, the electronic distance measurement device may use the reflected light for triangulation with respect to one or more virtual lines 168 and/or to aid in trilateration.

In addition, in at least one embodiment, the controller 166 may itself use information supplied from one or more autonomous vehicles that may be part of the fleet of emergency vehicles 143. For example, the vehicle(s) may supply a live video feed, "dashcam" footage, indications of potential obstacles, etc. The controller 166 may control other systems, e.g., components of systems 10, 11, 12 based on information received from one or more autonomous vehicles traveling relative to virtual line 168 or an indication that the one or more autonomous vehicles is traveling on the virtual line 168. For example, in at least one embodiment, the controller 166 may control the above-mentioned water displacement devices to selectively switch on or off based on information from one or more of the autonomous vehicles, which is communicated over the network. By way of example, if audiovisual information relayed from an autonomous vehicle indicates occurrence of an incident, the controller 166 may deploy various nodes 140 closest to the incident.

Each of the computer readable media as described above may be a tangible computer readable storage medium storing computer readable program code. The computer readable storage medium may be, for example, but not limited to, an electronic, magnetic, optical, electromagnetic, infrared, holographic, or semiconductor system, apparatus, or device, or any suitable combination of the foregoing. Examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, or a holographic storage medium, or any suitable combination of the foregoing. The computer readable storage medium may be any tangible medium that can contain, and/or store computer readable program code for use by and/or in connection with an instruction execution system, apparatus, or device.

Figure 16:
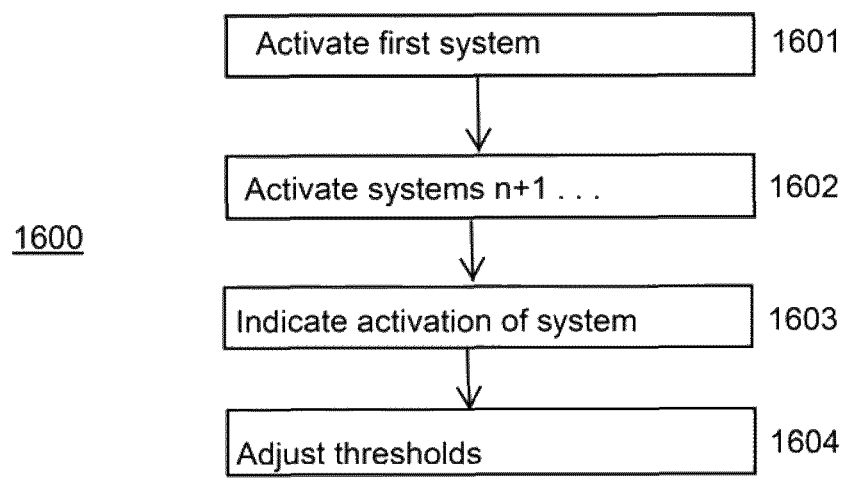
FIG. 16 depicts a process according to an embodiment.

FIG. 16 depicts a method 1600 of securing a perimeter. The method comprises activating a first security system in response to a first stimulus (step 1601). For example, a first node 140 may be activated by deploying one or more of the audiovisual module 117, imaging module 118, emergency telecommunication module 116, motion sensor module 119, high-intensity deterrent module 120, gas dispersal module 161, and water displacement module 164. Further still, a second node 140 may activate one or more of its modules in response to a stimulus that may be the same or different as the stimulus associated with activation of the first node 140 (step 1602).

By connecting one or more nodes 140 to be in communication with one or more second nodes 140 (e.g., through a network), the central computing unit 166 may control a second node 140 to activate one or more its modules after one or more modules of a first node 140 has been activated. Accordingly, method 1600 may further include activating a second security system following activation of the first security system (step 1603). For example, the second security system (a second node 140) may be configured to provide an audiovisual output indicative of activation of the first security system. In particular, the second node 140 may be positioned closer to an oncoming emergency vehicle from vehicle fleet 143, and may broadcast a message through a speaker to indicate the location of an incident and that the first node 140 has been activated (e.g., that the water displacement module 164 has been activated). In this manner, the network of nodes 150 may leverage a 'wave effect' of progressive responsiveness to an emergency incident. Moreover, by providing a plurality of nodes 140 at different locations, the information supplied by individual nodes positioned closer to an incident location can be used to provide preemptive warnings/notifications. In this manner, emergency response time may be reduced.

Further, as described above, the central computing unit 166 may determine thresholds at which the individual modules are activated. Such thresholds are adjustable, and according to method 1600, the computing unit 166 may adjust the thresholds (e.g., to shorten or length a particular distance that an object must reach before an action is taken or not taken) according to a control protocol (step 1604). For example, in at least one embodiment, the computing unit 166 may adjust one or more thresholds (e.g., a first, second or third predetermined distance) for a particular individual node 140 in response to determining that an object (e.g., an organism such as a person or animal) ceases movement toward a boundary associated with that particular node 140. In at least one embodiment, the computing unit 166 may adjust one or more thresholds for a particular node 140 based on activation of a module of one or more other nodes 140.

In at least one embodiment, each of the nodes 140 may be activated by a controller (e.g., central computing unit 166) in communication with the nodes 140. The controller is configured to activate subsequent nodes (e.g., second, third, fourth . . . nth security systems) responsive to activation of earlier nodes (e.g., a first, second . . . n-1th security system). The controller is configured to control each of the individual nodes 140 in response to one or more of global positioning satellite data received by the controller (e.g., from GPS satellite 142), pre-planned route information stored in a memory of the controller, and emergency vehicle fleet information related to vehicle fleet 143, and information relating to one or more autonomous vehicles which may or may not be part of the fleet. For example, the controller is configured to activate/deactivate any system within the node (e.g., a water displacement device) in response to one or more of the satellite data, pre-planned route information, fleet information, and autonomous vehicle information. Further still, when a first node 140 becomes 'aware' of activation of another node, the first node may be controlled to provide a notification (e.g., through the audiovisual module 117) so as to alert pedestrians of an incident or that emergency vehicles from fleet 143 are approaching.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGS. It should be noted that the orientation of various elements may differ according to other exemplary embodiments, and that such variations are intended to be encompassed by the present disclosure.

It is to be understood that to the extent that the present disclosure refers to certain preferred implementations, various other implementations and variants may occur to those skilled in the art, which are within the scope and spirit of the disclosure, and such other implementations and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design and arrangement of the various exemplary embodiments without departing from the scope of the present disclosure.

What is claimed is:

1. A perimeter security system for maintaining an object relative to a predefined boundary, comprising:
    a plurality of water displacement devices configured to output fluid and to control a pressure of the outputted fluid when the object is within a first distance from the boundary;
    a plurality of light sources configured to emit light toward the object when the object is within a second distance from the boundary;
    an auditory system configured to emit an audible output when the object is within a third distance from the boundary;
    a visual sensor configured to obtain images or video of at least a portion of the predefined boundary and to transmit the images or video to a location other than the predefined boundary; and
    a controller configured to determine when the object ceases movement toward the boundary and to adjust the first, second, and third distances in response to the determination.

2. The perimeter security system of claim 1, comprising:
    a portable housing configured to store at least one of the plurality of water displacement devices, at least one of the plurality of light sources, the auditory system, the visual sensor, and a gas emitter configured to eject gas in a direction toward the object when the object is within a predetermined distance from the portable housing.

3. The perimeter security system of claim 2, further comprising:
    a plurality of portable housings distributed at intervals along the boundary.

4. The perimeter security system of claim 2, wherein the portable housing comprises a cylindrical enclosure, the cylindrical enclosure having a first height in an extended position and a second height in a retracted position relative to a base.

5. The perimeter security system of claim 1, further comprising:
   a power source configured to supply power to at least one of the plurality of water displacement devices, at least one of the plurality of light sources, and the auditory system.

6. The perimeter security system of claim 1, wherein the controller is configured to adjust pressures of fluid outputted by the plurality of water displacement devices.

* * * * *